United States Patent
Tanaka

(10) Patent No.: US 10,999,828 B2
(45) Date of Patent: May 4, 2021

(54) WIRELESS COMMUNICATIONS SYSTEM, BASE STATION, AND TERMINAL

(71) Applicant: FUJITSU CONNECTED TECHNOLOGIES LIMITED, Kawasaki (JP)

(72) Inventor: Yoshinori Tanaka, Yokohama (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 297 days.

(21) Appl. No.: 15/332,687

(22) Filed: Oct. 24, 2016

(65) Prior Publication Data

US 2017/0041912 A1 Feb. 9, 2017

Related U.S. Application Data

(63) Continuation of application No. PCT/JP2014/062532, filed on May 9, 2014.

(51) Int. Cl.
*H04W 16/14* (2009.01)
*H04W 72/04* (2009.01)
(Continued)

(52) U.S. Cl.
CPC ......... *H04W 72/042* (2013.01); *H04L 5/0051* (2013.01); *H04W 16/14* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

| 6,901,060 B1 | 5/2005 | Lintulampi |
| 2005/0229071 A1 | 10/2005 | Uga |

(Continued)

FOREIGN PATENT DOCUMENTS

| CN | 103370896 A | 10/2013 |
| JP | 2001-224072 A | 8/2001 |

(Continued)

OTHER PUBLICATIONS

International Search Report issued for corresponding International Patent Application No. PCT/JP2014/062532, dated Aug. 5, 2014.
(Continued)

*Primary Examiner* — Michael J Moore, Jr.
*Assistant Examiner* — Prenell P Jones
(74) *Attorney, Agent, or Firm* — Myers Wolin, LLC

(57) ABSTRACT

A wireless communications system is configured to perform wireless communication by using a first band dedicated to the system and a second band shared by the system and another wireless communications system. The system includes a base station configured to transmit in the first band to a terminal when detecting an available carrier wave of the second band, a control signal permitting data transmission in the second band from the terminal to the base station, the base station continuously sending out a radio wave of the second band during a period until the data transmission; and the terminal configured to perform the data transmission after a predetermined time from transmission of the control signal by the base station.

6 Claims, 32 Drawing Sheets

(51) Int. Cl.
  *H04W 74/08* (2009.01)
  *H04L 5/00* (2006.01)
  *H04W 76/10* (2018.01)
  *H04L 27/06* (2006.01)
  *H04L 27/26* (2006.01)
  *H04L 27/00* (2006.01)

(52) U.S. Cl.
  CPC ... *H04W 72/0446* (2013.01); *H04W 72/0453* (2013.01); *H04W 74/0816* (2013.01); *H04L 5/001* (2013.01); *H04L 27/0006* (2013.01); *H04L 27/066* (2013.01); *H04L 27/266* (2013.01); *H04W 76/10* (2018.02)

(56) References Cited

U.S. PATENT DOCUMENTS

| | | | |
|---|---|---|---|
| 2006/0045032 A1* | 3/2006 | Hamada | H04B 7/26 370/278 |
| 2009/0046641 A1 | 2/2009 | Wang et al. | |
| 2010/0124215 A1* | 5/2010 | Kogawa | H04W 16/14 370/347 |
| 2011/0044303 A1 | 2/2011 | Ji et al. | |
| 2012/0093103 A1 | 4/2012 | Lee et al. | |
| 2013/0010732 A1 | 1/2013 | Kawasaki et al. | |
| 2013/0039305 A1 | 2/2013 | Kishiyama et al. | |
| 2013/0157677 A1* | 6/2013 | Liao | H04W 52/0212 455/452.1 |
| 2013/0287043 A1 | 10/2013 | Nanda et al. | |
| 2014/0119421 A1* | 5/2014 | El-Hassan | H04B 17/29 375/227 |
| 2014/0140314 A1 | 5/2014 | Wei et al. | |
| 2014/0204771 A1 | 7/2014 | Gao et al. | |
| 2014/0335863 A1* | 11/2014 | Wu | H04W 36/0083 455/436 |
| 2014/0378157 A1* | 12/2014 | Wei | H04W 16/14 455/454 |
| 2015/0043471 A1* | 2/2015 | Rinne | H04W 16/14 370/329 |
| 2015/0131536 A1* | 5/2015 | Kaur | H04L 5/001 370/329 |
| 2015/0351047 A1* | 12/2015 | Bengtsson | H04W 72/1268 370/252 |
| 2016/0073407 A1 | 3/2016 | Nagata et al. | |
| 2016/0100389 A1* | 4/2016 | Zhao | H04L 5/0094 370/329 |
| 2016/0127952 A1* | 5/2016 | You | H04W 28/20 370/252 |
| 2016/0165586 A1* | 6/2016 | Yu | H04W 72/0453 370/329 |
| 2016/0174273 A1* | 6/2016 | Ginnela | H04W 76/18 455/39 |
| 2016/0234842 A1 | 8/2016 | Kawasaki et al. | |
| 2016/0255630 A1 | 9/2016 | Etemad | |
| 2017/0078863 A1* | 3/2017 | Kim | H04W 48/16 |
| 2017/0318543 A1* | 11/2017 | Nam | H04L 5/0005 |
| 2018/0006776 A1* | 1/2018 | Fwu | H04L 5/0091 |

FOREIGN PATENT DOCUMENTS

| | | |
|---|---|---|
| JP | 2003-158764 A | 5/2003 |
| JP | 2007-134946 A | 5/2007 |
| JP | 2009-207149 A | 9/2009 |
| JP | 2009-218715 A | 9/2009 |
| JP | 2010-119058 A | 5/2010 |
| JP | 2013-502191 A | 1/2013 |
| JP | 2013-062848 A | 4/2013 |
| JP | 2014-500685 A | 1/2014 |
| KR | 2010-0020753 A | 2/2010 |
| KR | 2014-0010450 A | 1/2014 |
| KR | 2014-0017517 A | 2/2014 |
| WO | 03/101030 A1 | 12/2003 |
| WO | 2012/040520 A1 | 3/2012 |
| WO | 2012/167193 A2 | 12/2012 |
| WO | 2013/006988 A1 | 1/2013 |
| WO | 2013/025547 A2 | 2/2013 |
| WO | 2013/087835 A1 | 6/2013 |

OTHER PUBLICATIONS

International Preliminary Report on Patentability for corresponding International Patent Application No. PCT/JP2014/062532 dated Aug. 5, 2014, with English translation.

Ratasuk et al., "License-Exempt LTE Deployment in Heterogeneous Network", IEEE copyright 2012.

Notice of Preliminary Rejection issued by the Korean Intellectual Property Office for corresponding Korean Patent Application No. 10-2016-7030832, dated Apr. 13, 2017, with English translation.

Notification of Reasons for Refusal issued by the Japan Patent Office for corresponding Japanese Patent Application No. 2016-517792, dated Jan. 16, 2018, with an English translation.

Extended European search report with supplementary European search report and the European search opinion issued by the European Patent Office for corresponding European Patent Application No. 14891339.5, dated Mar. 30, 2017.

Notification of Reasons for Refusal issued by the Japan Patent Office for corresponding Japanese Patent Application No. 2016-517792, dated Sep. 26, 2017, with an English translation.

Notice of Final Rejection issued by the Korean Intellectual Property Office for corresponding Korean Patent Application No. 10-2016-7030832, dated Oct. 26, 2017, with English translation.

First Notification of Office Action issued by the China National Intellectual Property Administration for corresponding Chinese Application No. 201480078581.9, dated Mar. 1, 2019 with an English translation.

Second Notification of Office Action issued in the corresponding Chinese application No. 201480078581.9, dated Jul. 31, 2019 with full English translation.

Non-Final Office Action issued by the United States Patent and Trademark Office for corresponding U.S. Appl. No. 16/233,874, dated May 1, 2020.

Final Office Action issued by the United States Patent and Trademark Office for corresponding U.S. Appl. No. 16/233,874, dated Nov. 17, 2020.

* cited by examiner

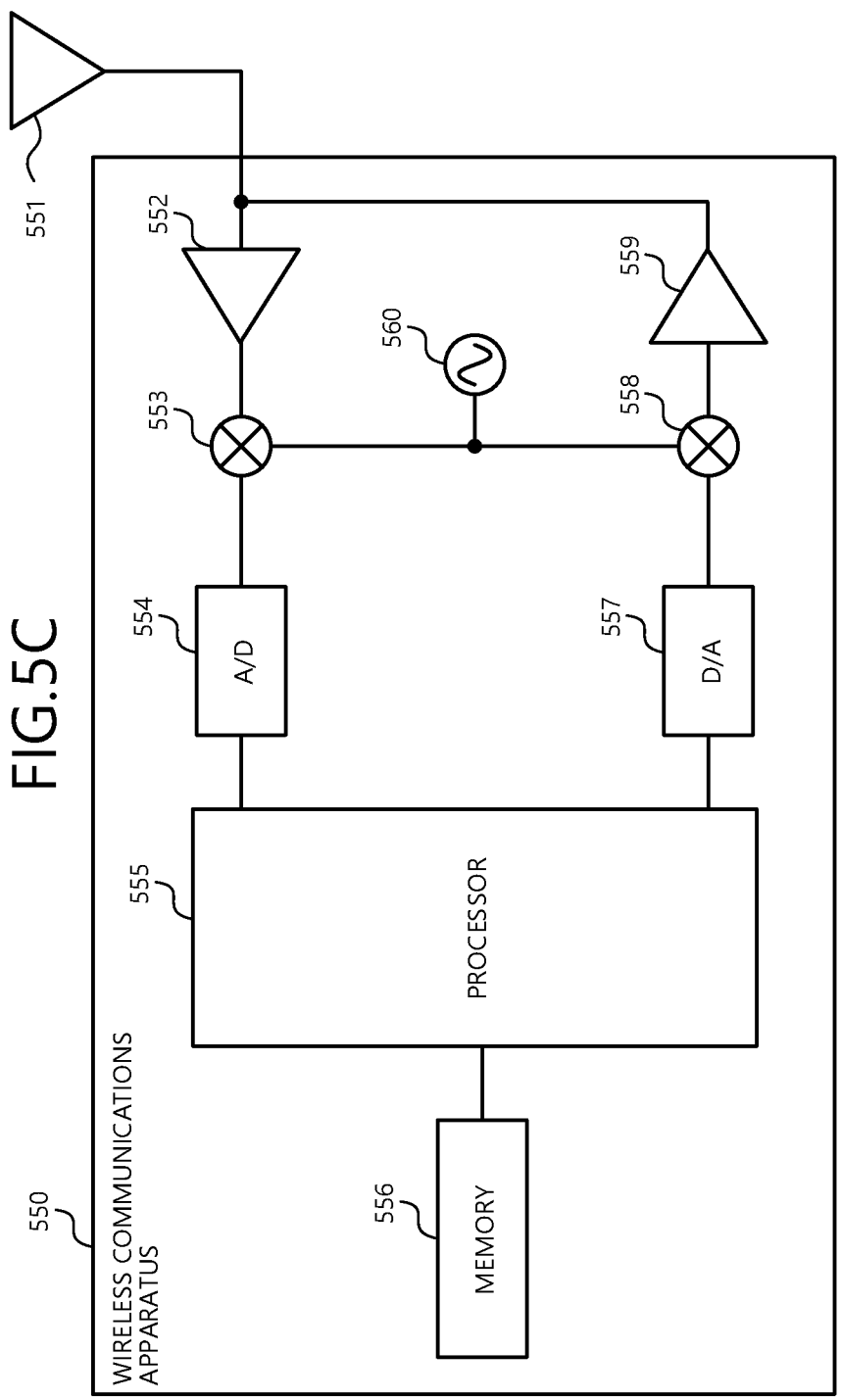

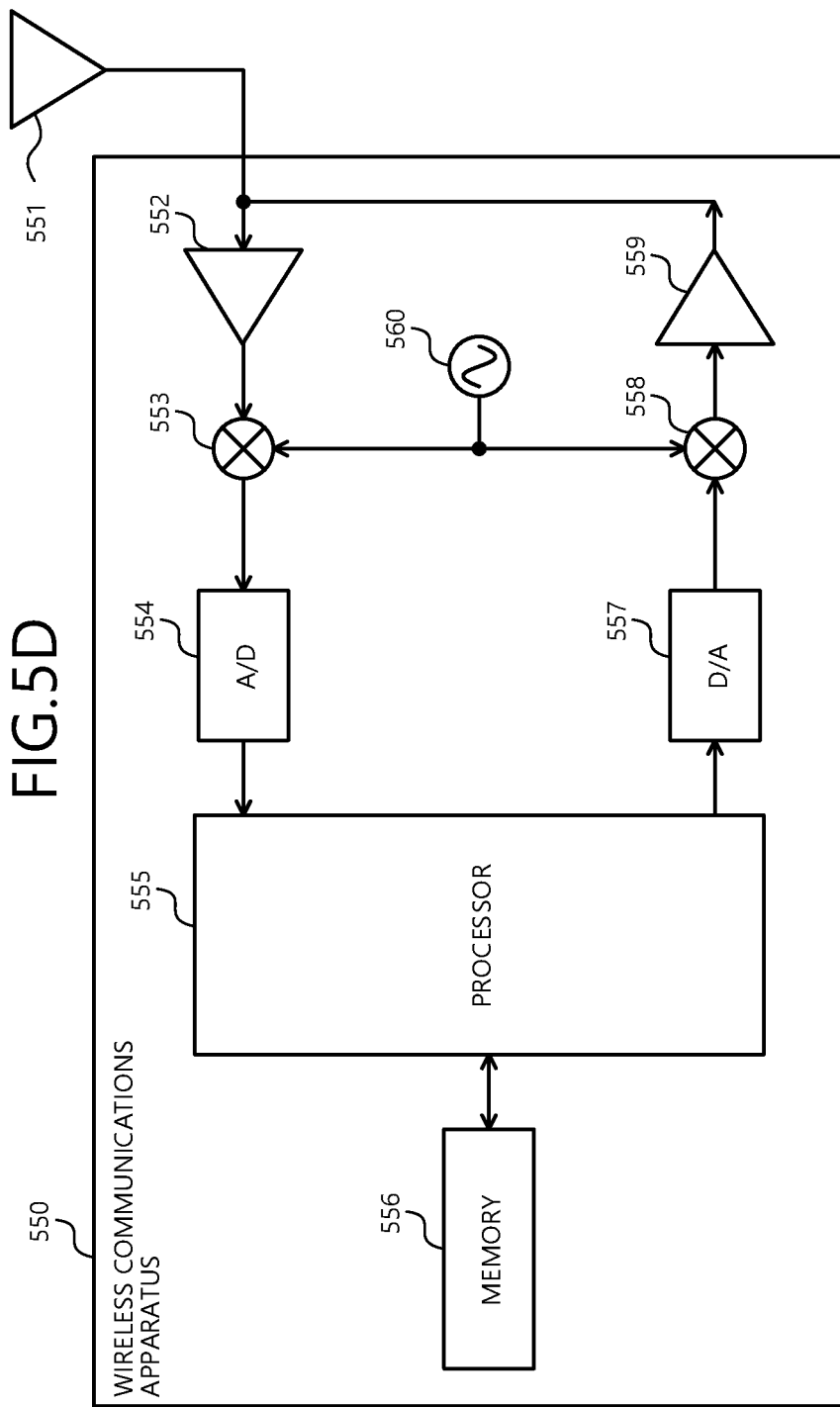

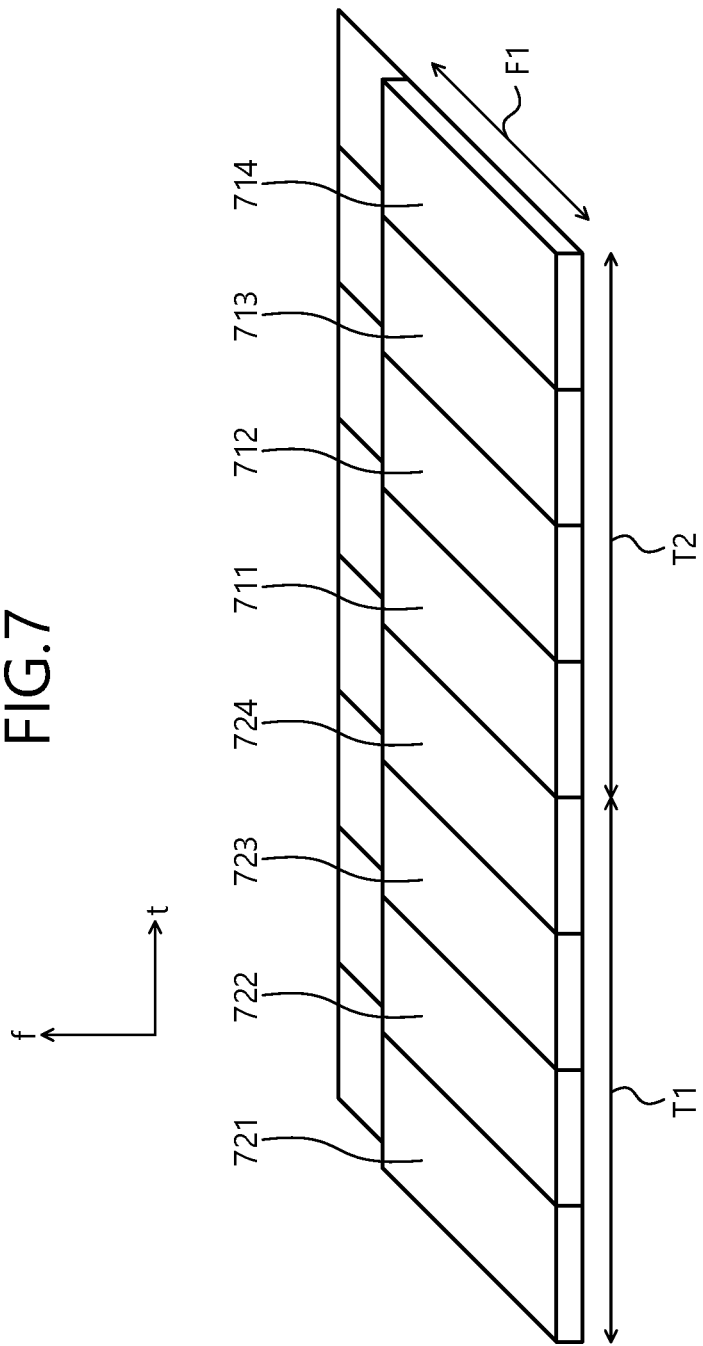

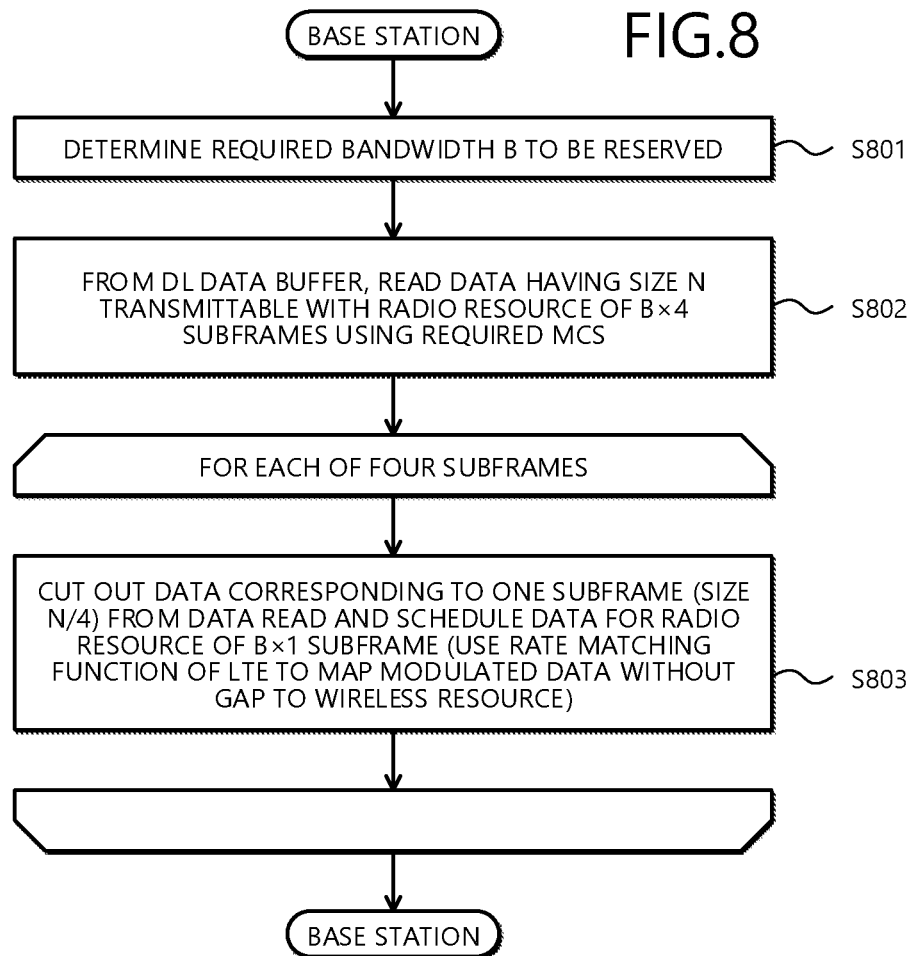

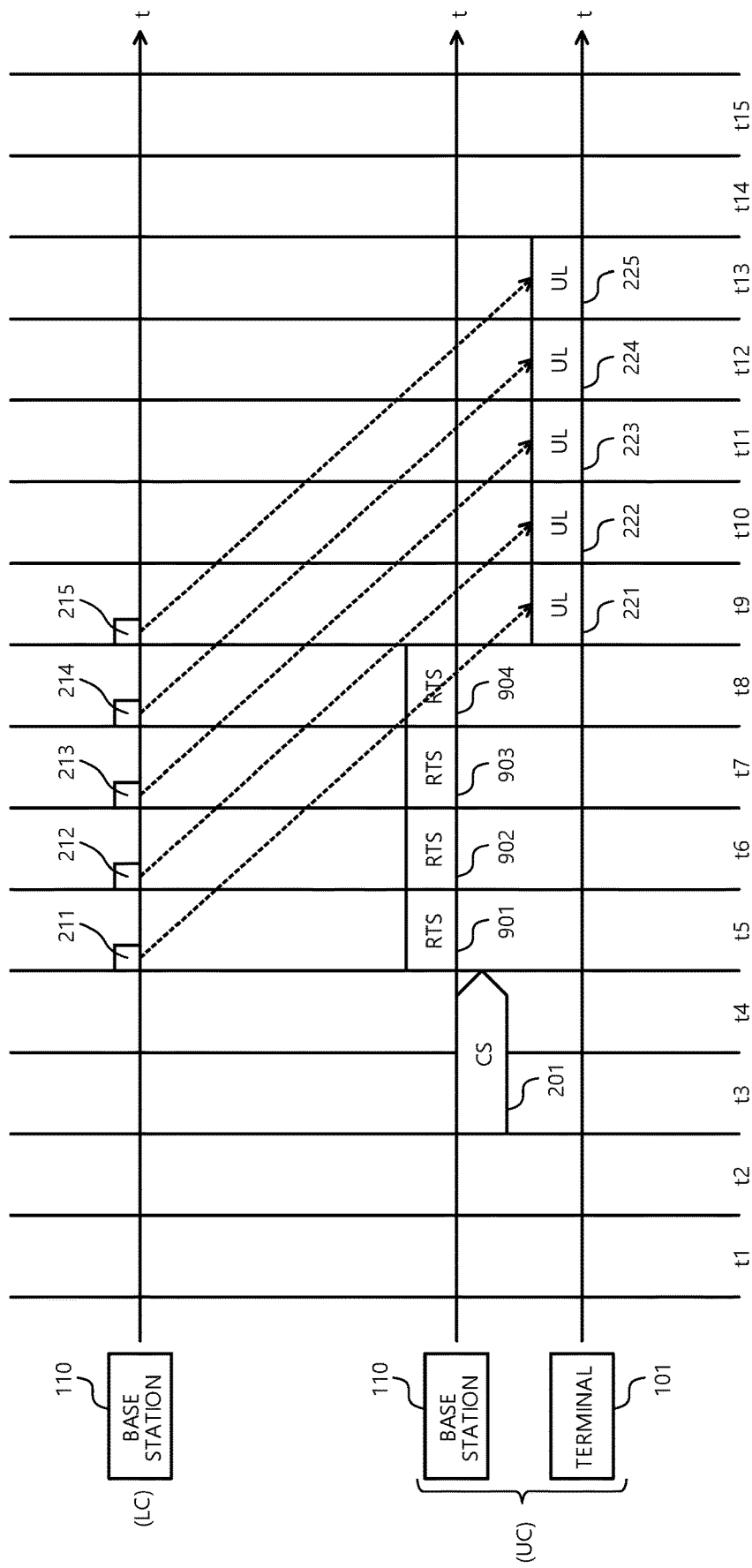

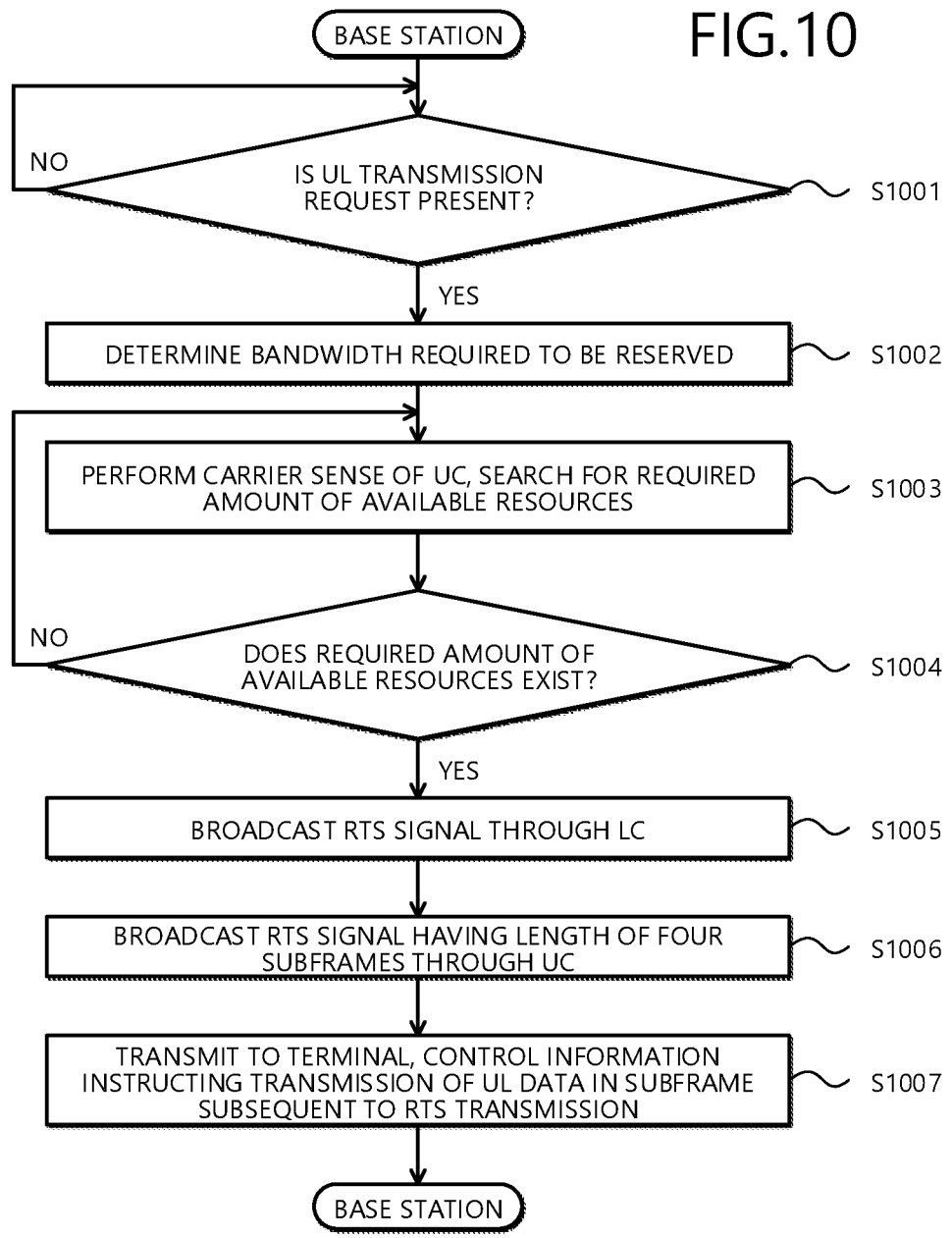

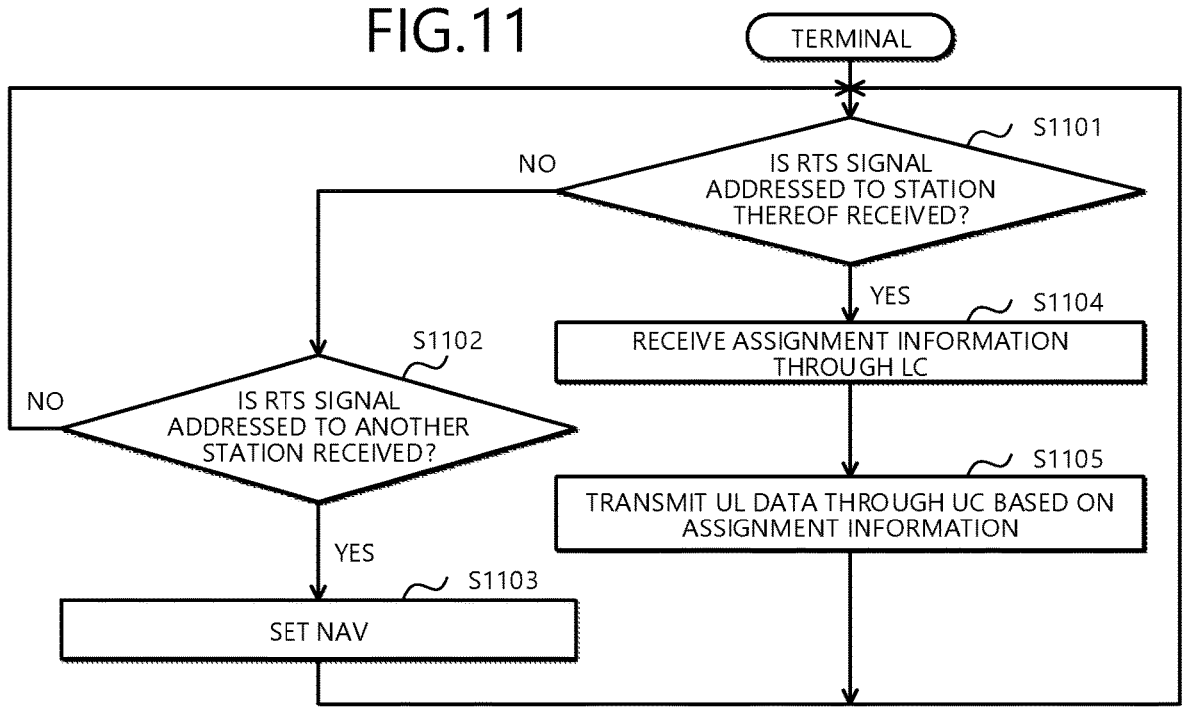

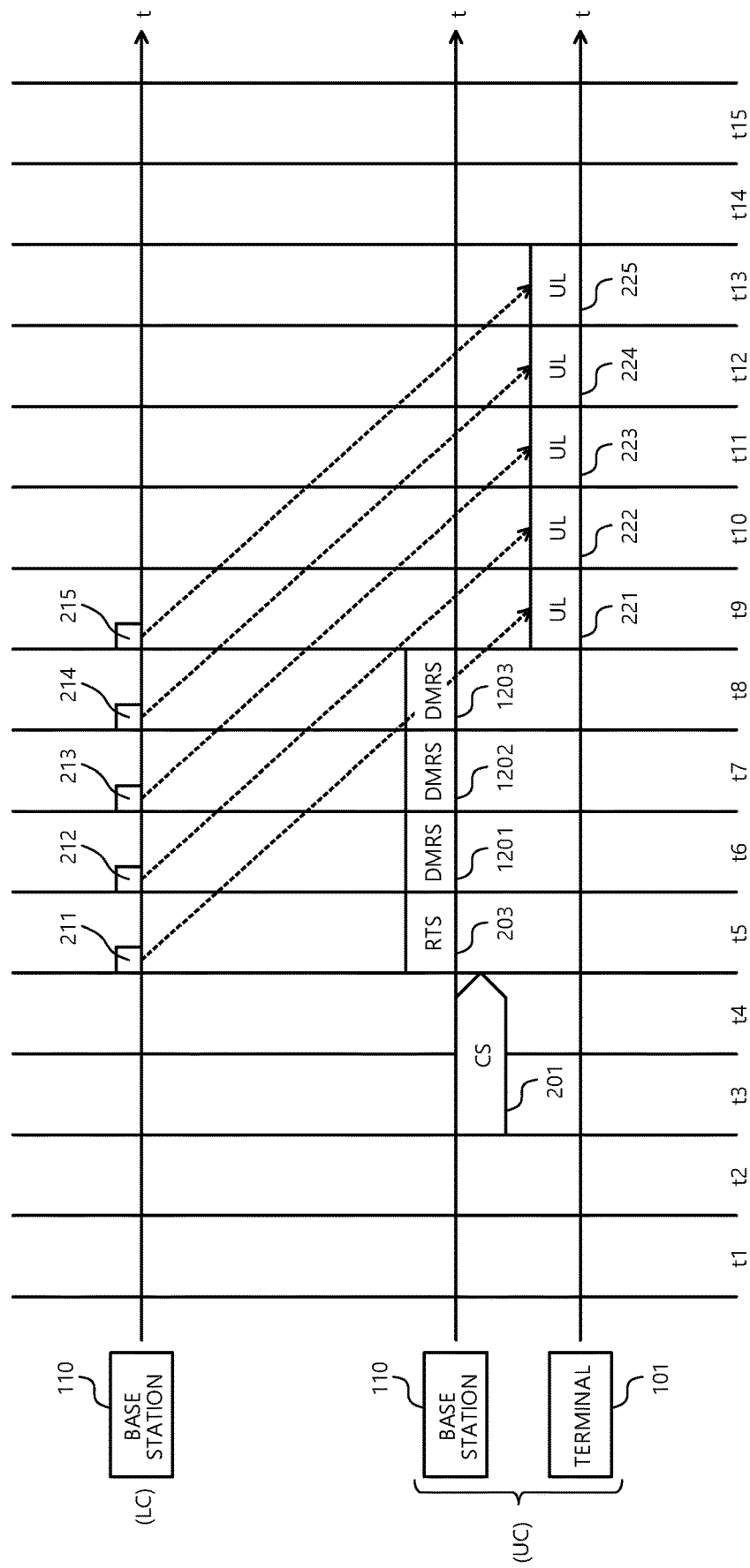

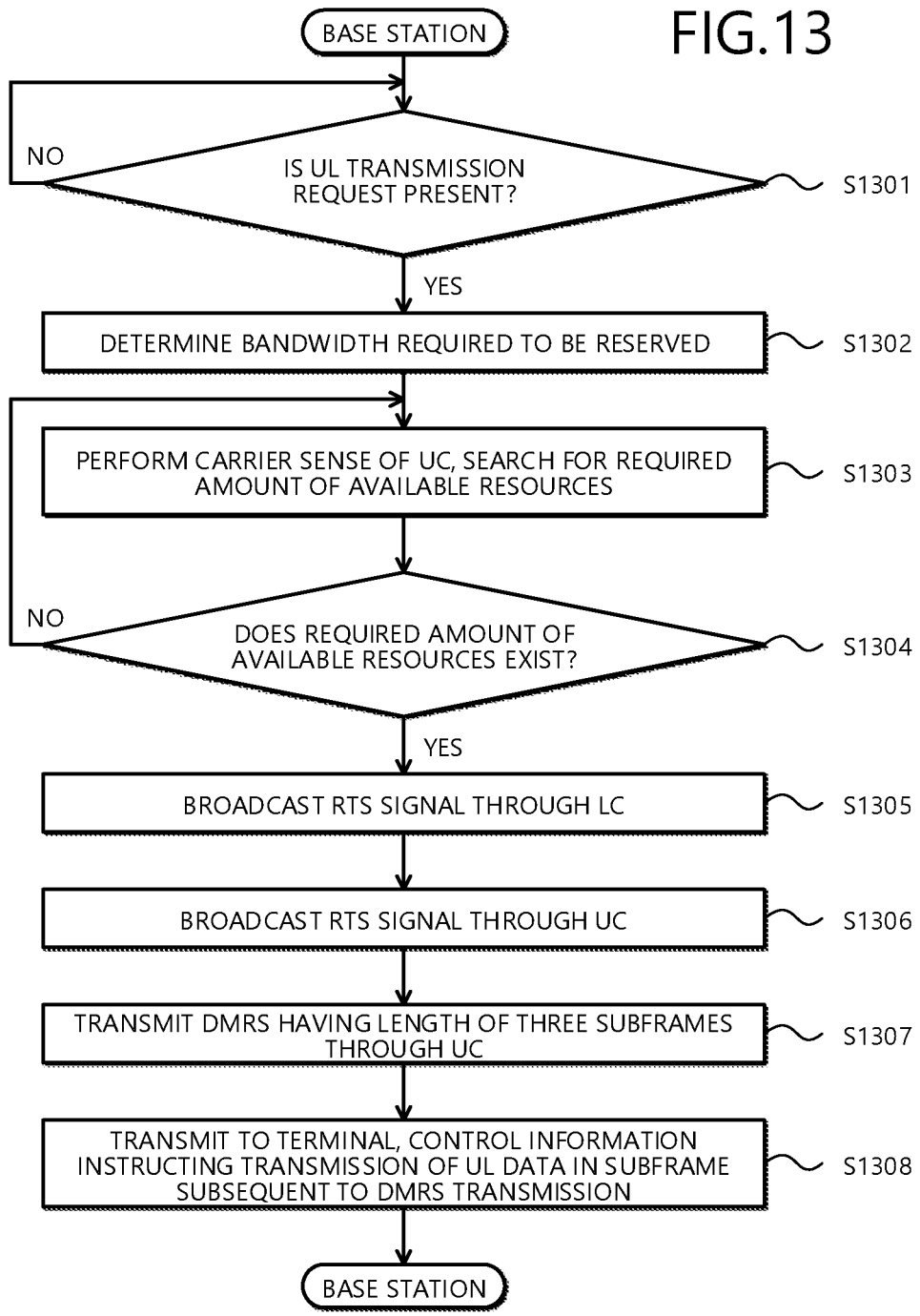

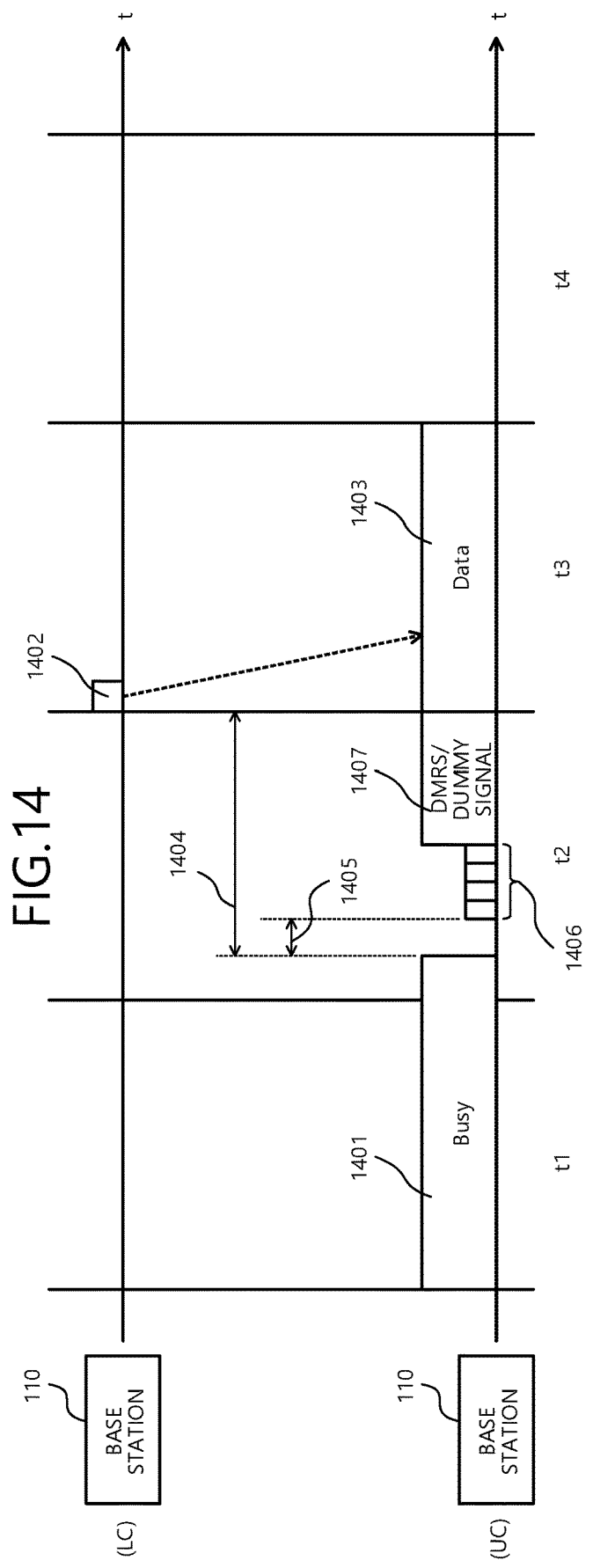

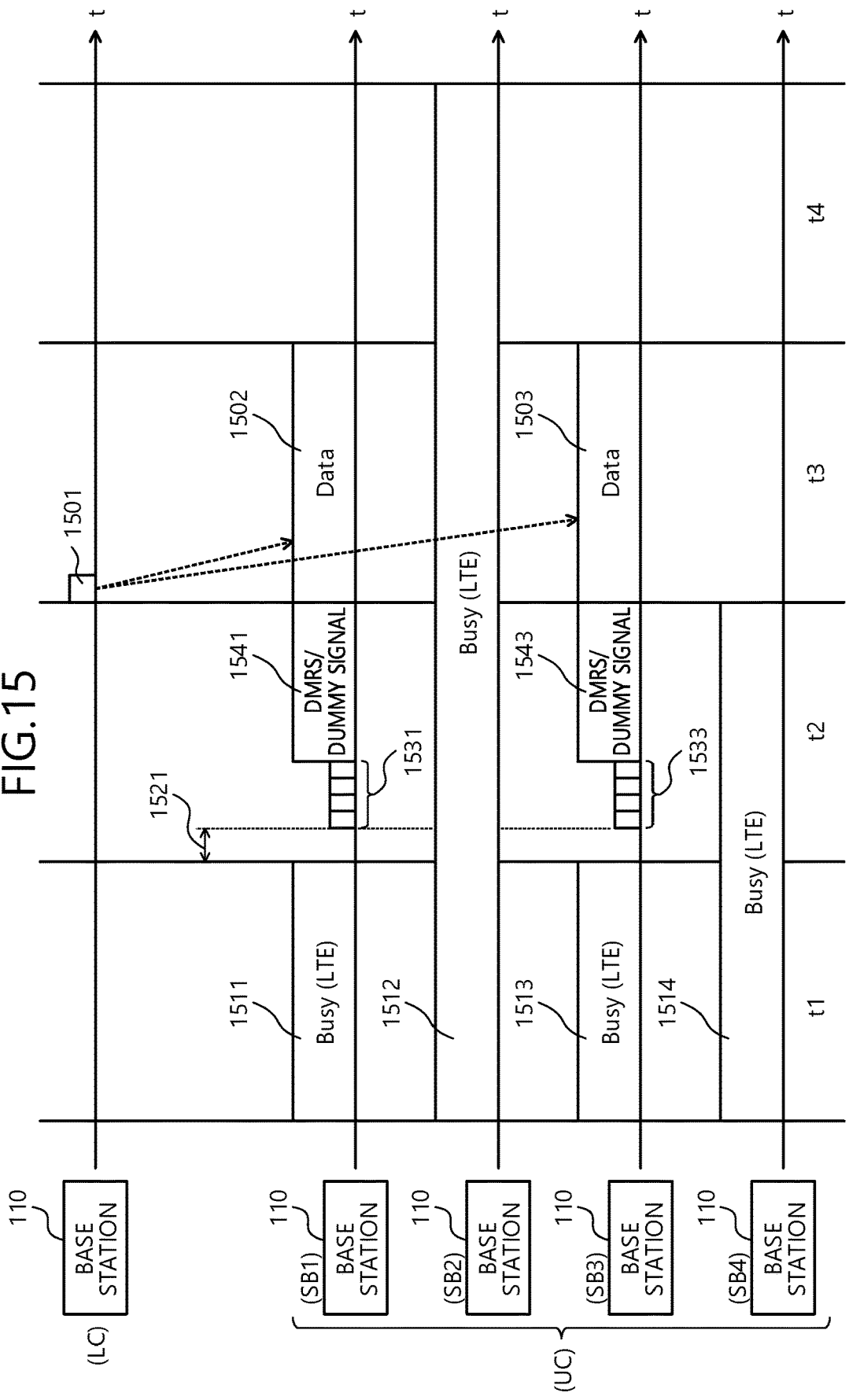

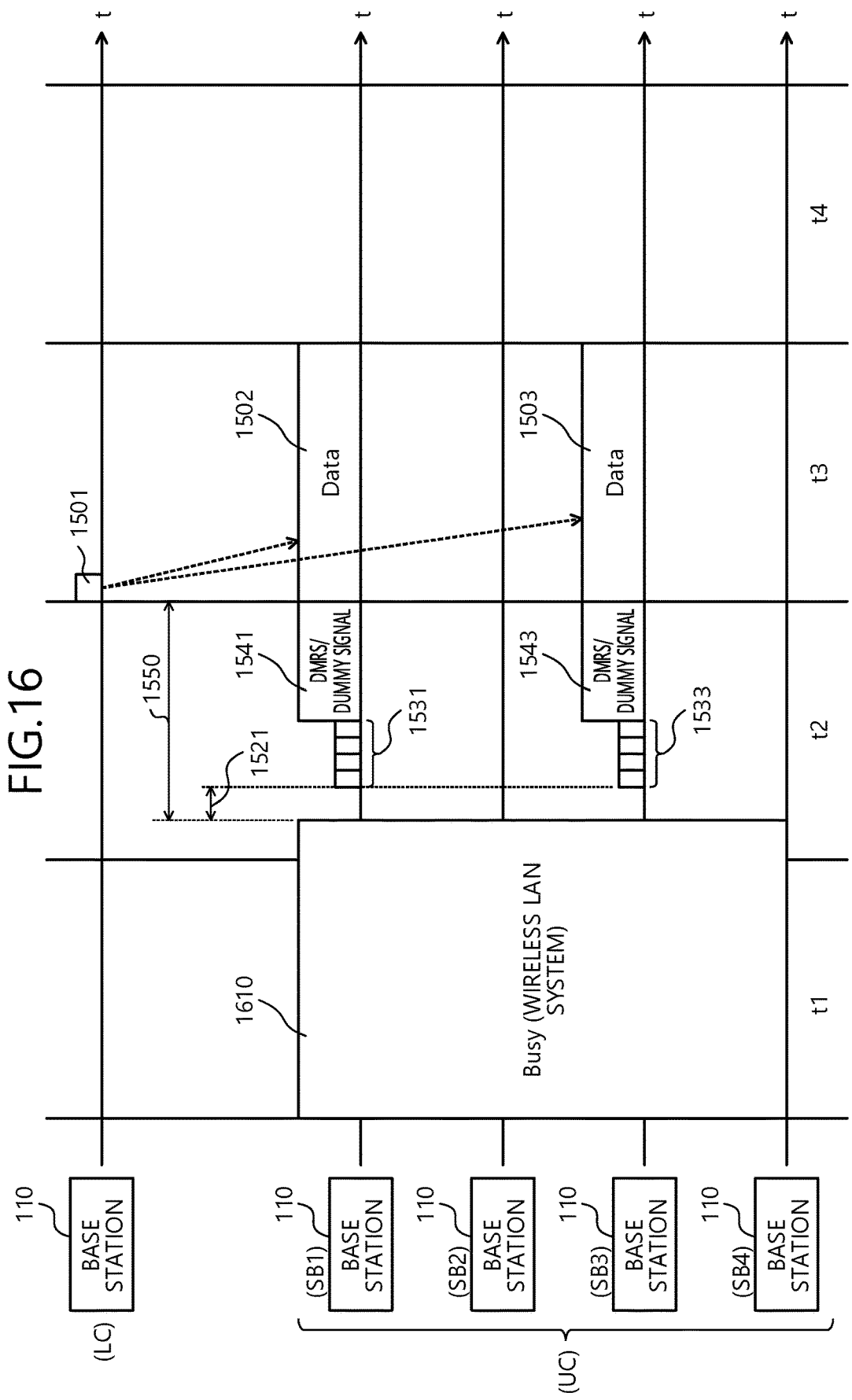

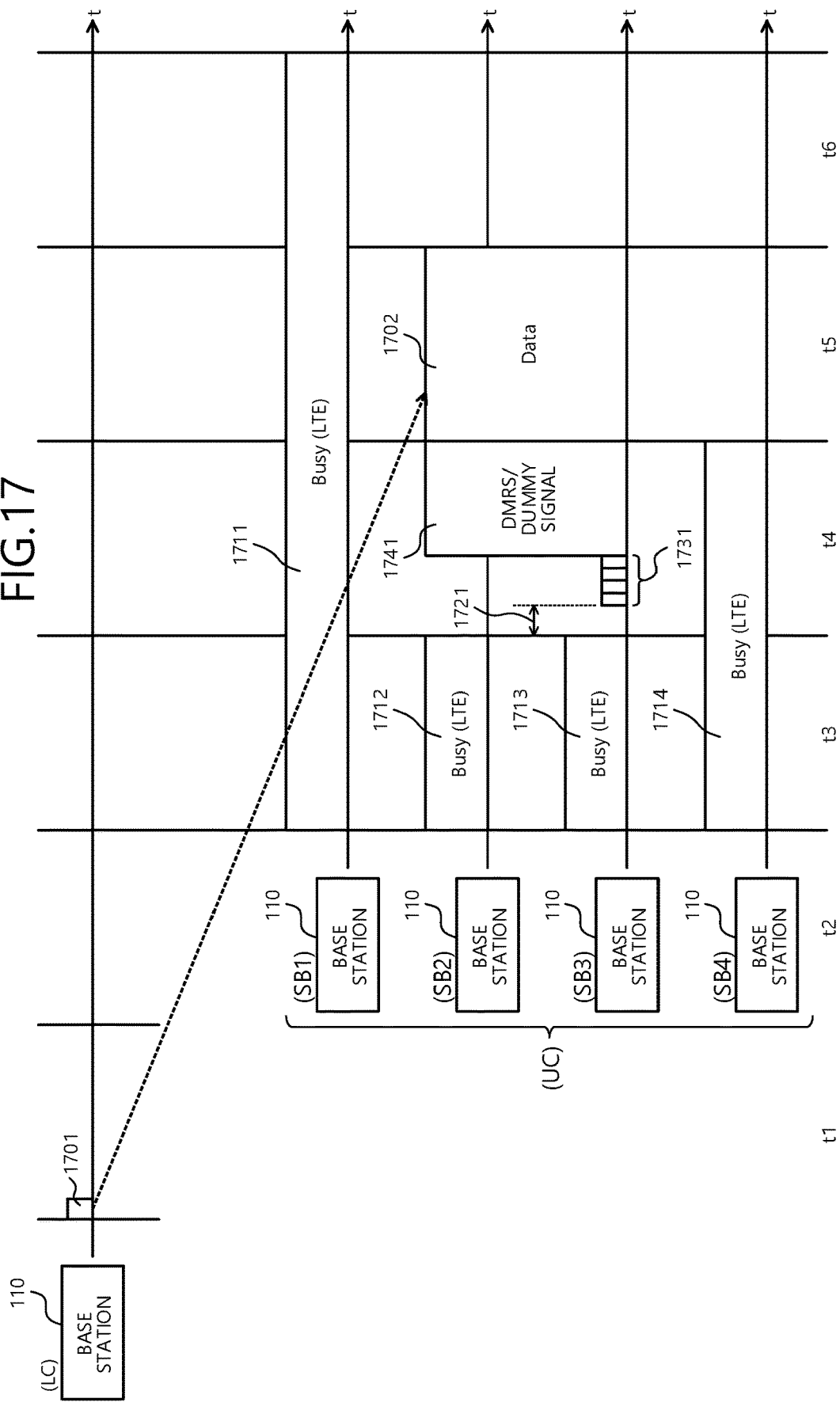

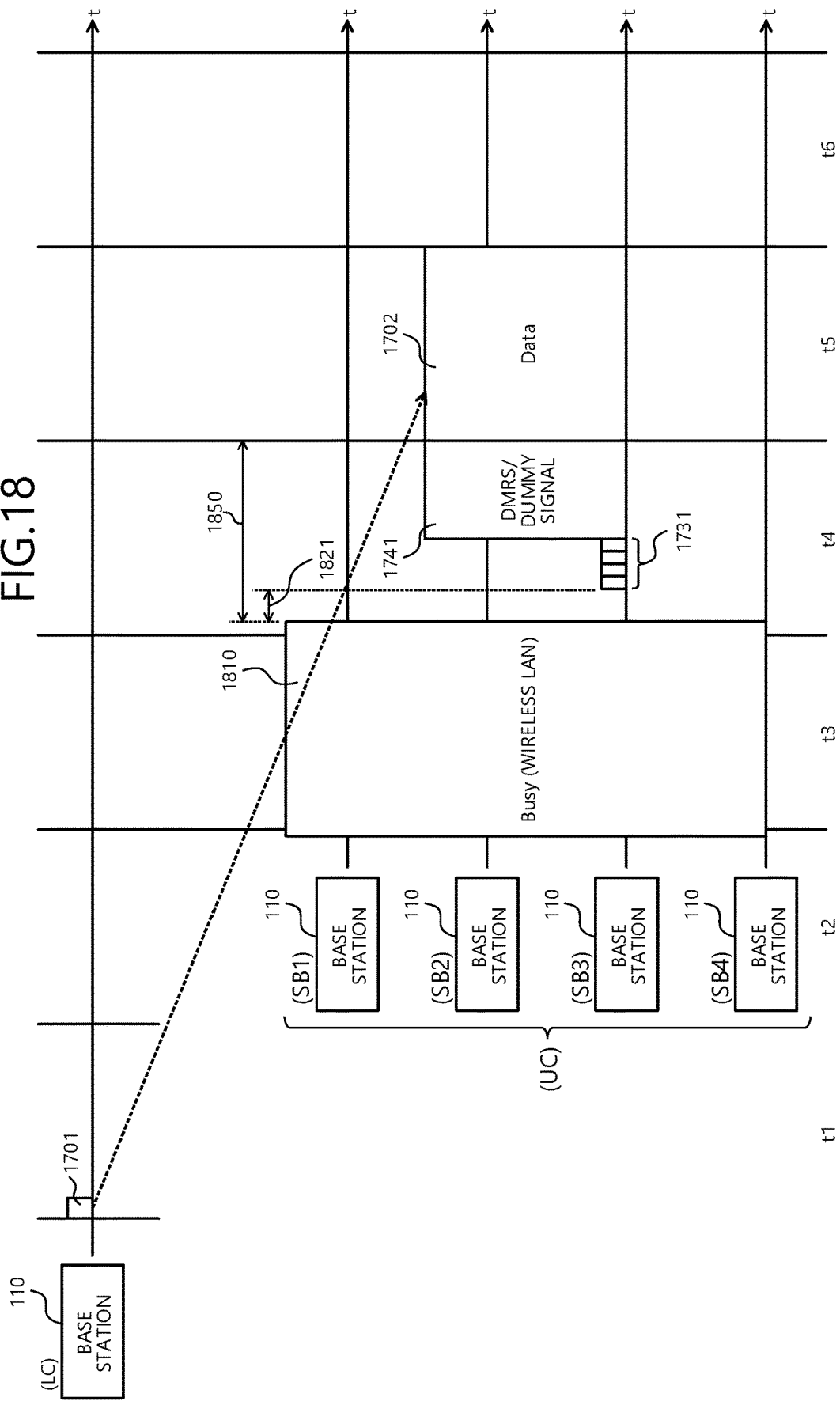

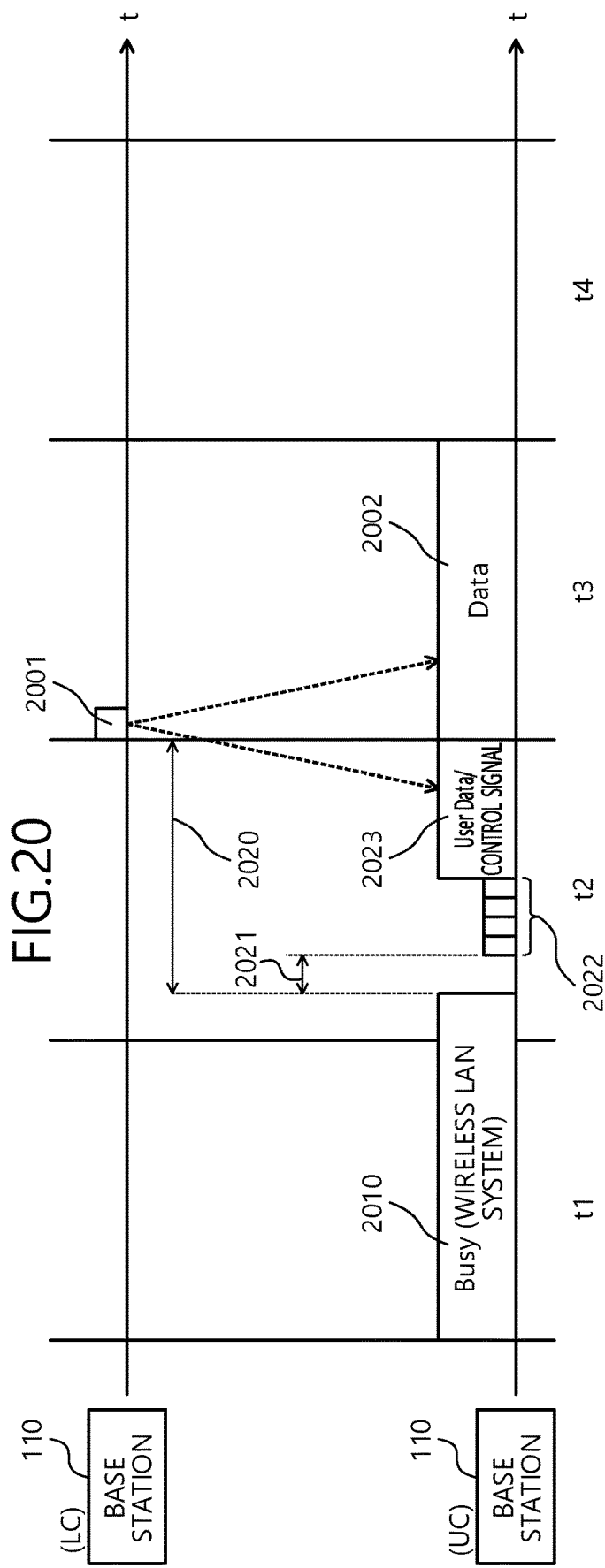

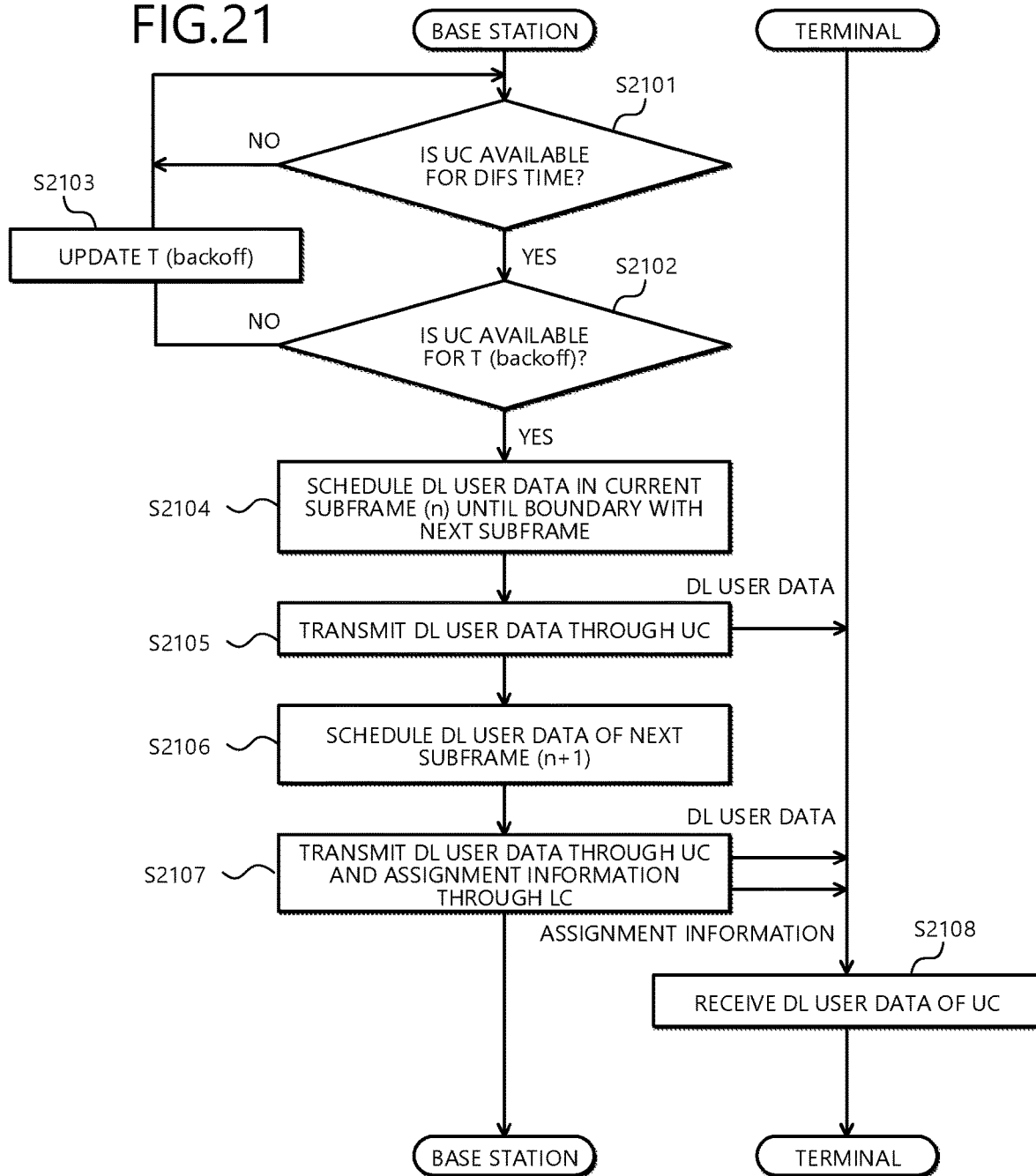

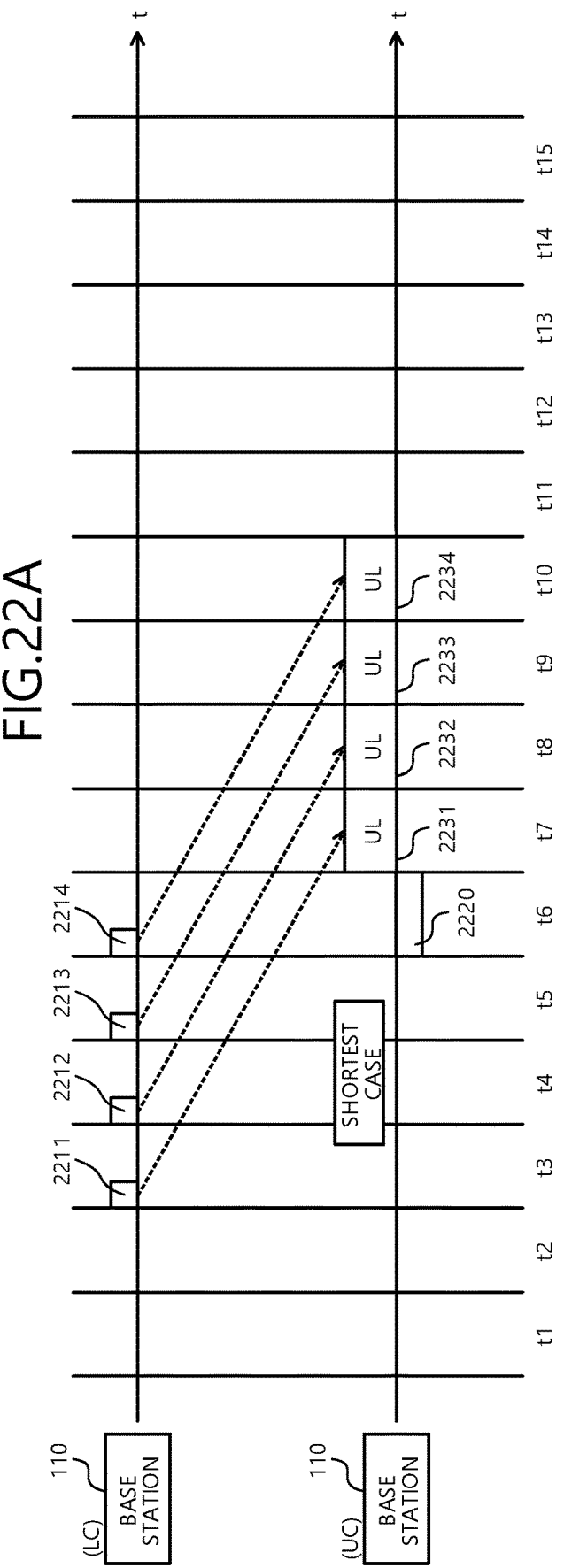

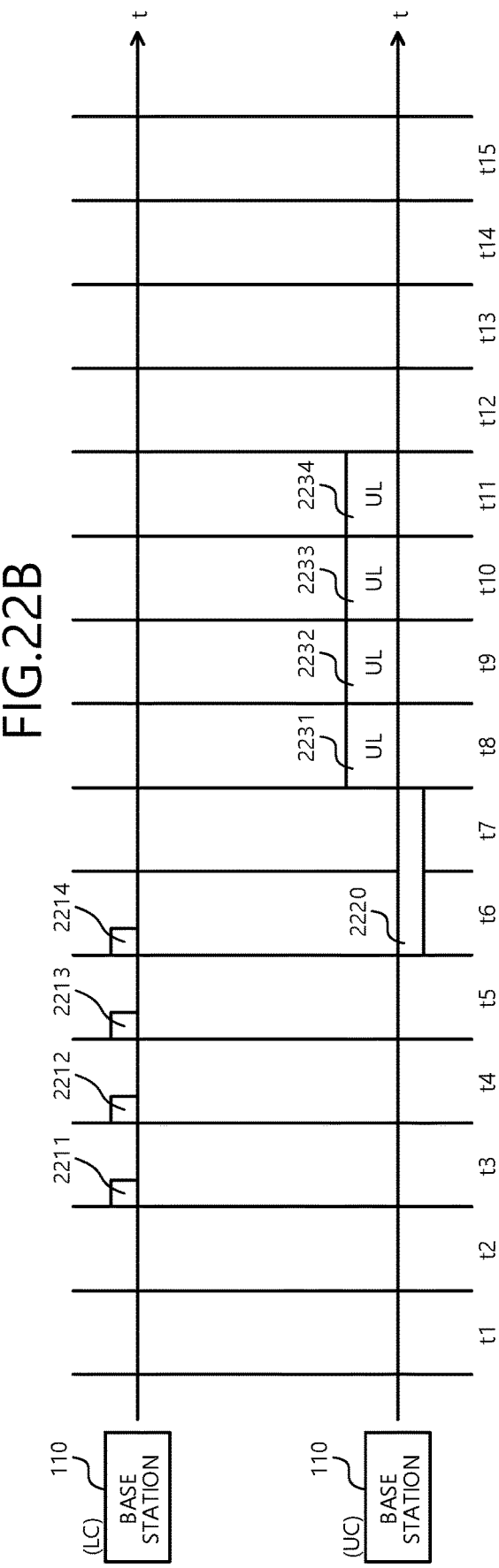

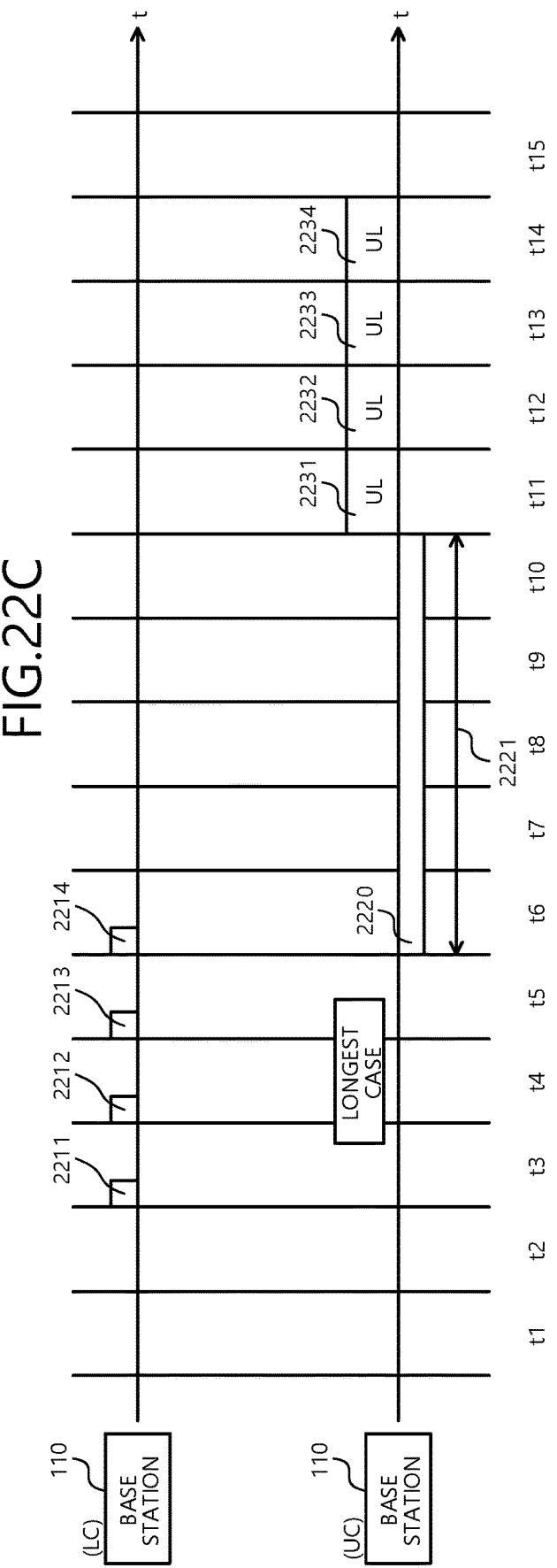

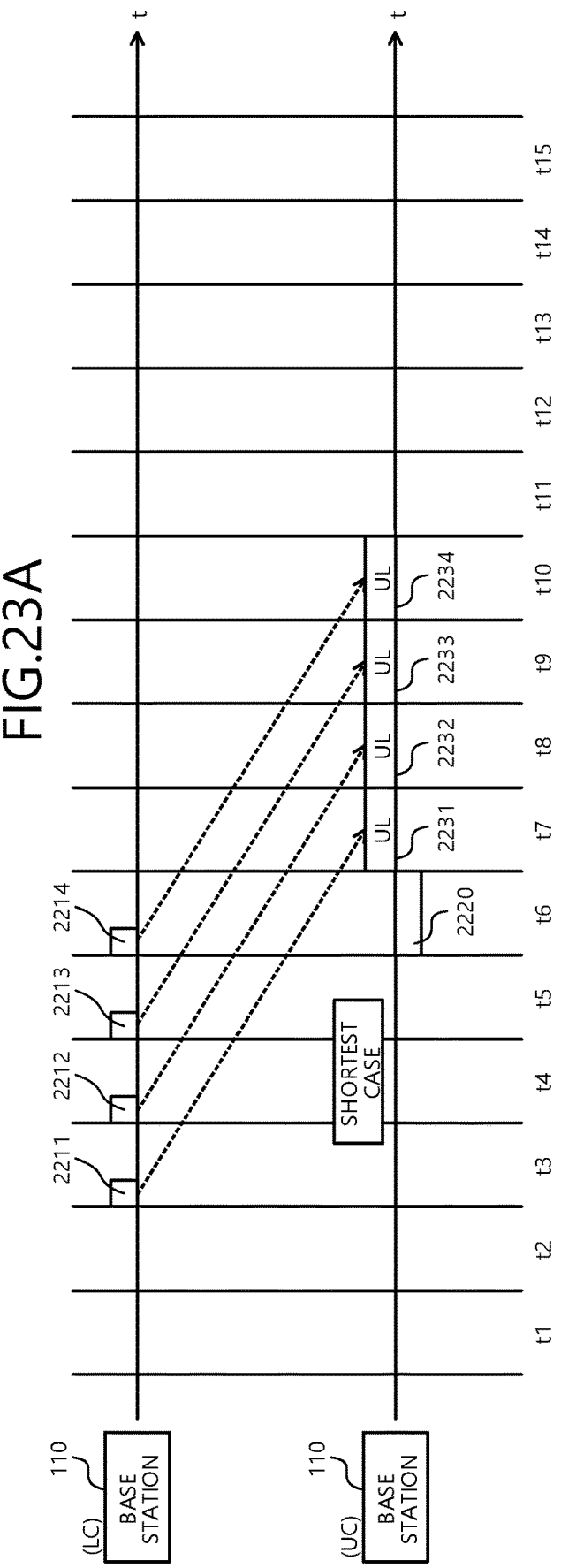

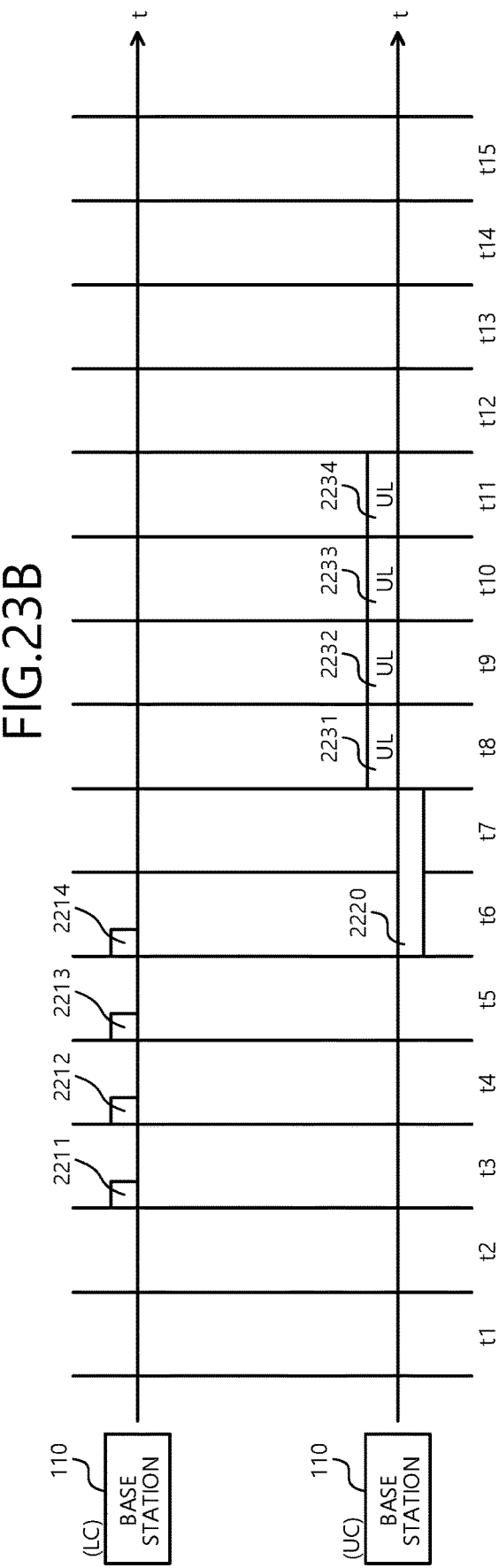

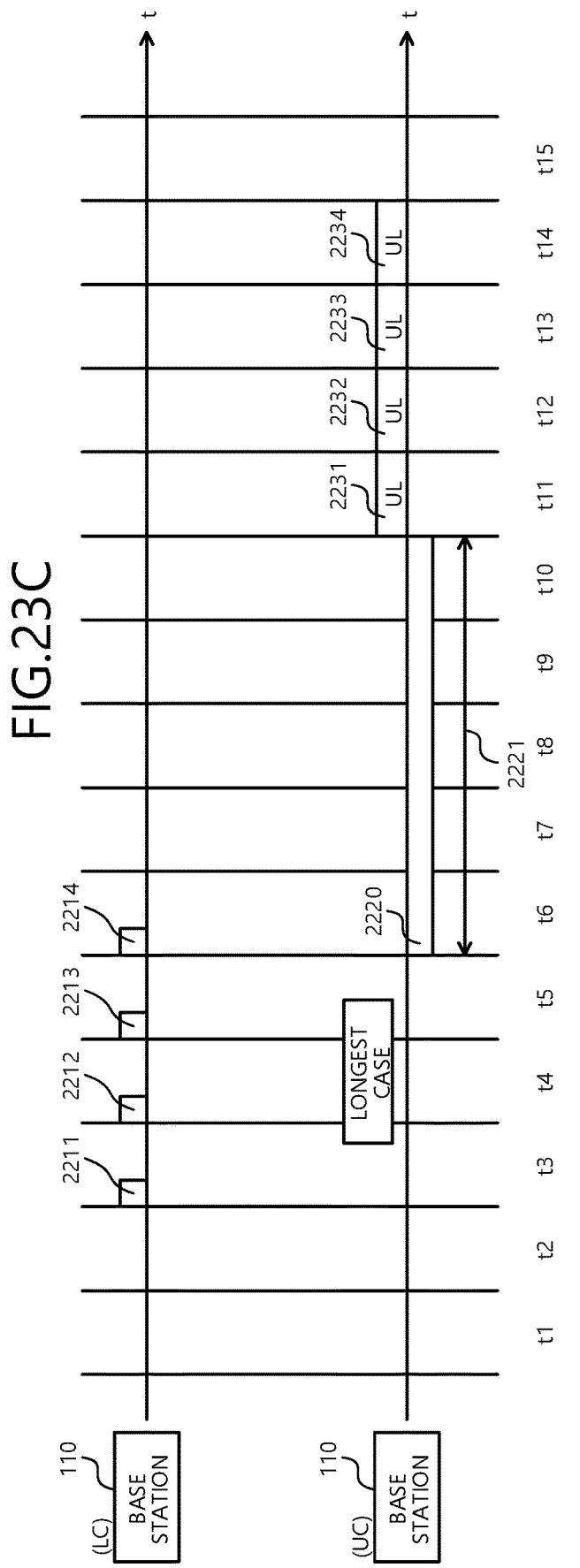

WIRELESS COMMUNICATIONS SYSTEM, BASE STATION, AND TERMINAL

CROSS REFERENCE TO RELATED APPLICATIONS

This application is a continuation application of International Application PCT/JP2014/062532, filed on May 9, 2014 and designating the U.S., the entire contents of which are incorporated herein by reference.

FIELD

The embodiments discussed herein relate to a wireless communications system, a base station, and a terminal.

BACKGROUND

A conventionally known apparatus is operational by a common medium for reception and transmission and includes a transmitter for transmitting multiple frames transmitted continuously at substantially reduced inter-frame intervals (see, for example, Japanese Laid-Open Patent Publication No. 2009-207149). A technique of performing a wireless cellular operation in an unlicensed spectrum or a spectrum licensed in a simplified manner is conventionally known (see, for example, Published Japanese-Translation of PCT Application, Publication No. 2014-500685).

SUMMARY

According to an aspect of an embodiment, a wireless communications system is configured to perform wireless communication by using a first band dedicated to the system and a second band shared by the system and another wireless communications system. The system includes a base station configured to transmit in the first band to a terminal when detecting an available carrier wave of the second band, a control signal permitting data transmission in the second band from the terminal to the base station, the base station continuously sending out a radio wave of the second band during a period until the data transmission; and the terminal configured to perform the data transmission after a predetermined time from transmission of the control signal by the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5C is a diagram of an example of a hardware configuration of an eNB;

FIG. 5D is a diagram of an example of signal flow in the hardware configuration depicted in FIG. 5A;

FIG. 7 is a diagram of an example of scheduling by the base station according to a second embodiment;

FIG. 8 is a flowchart of an example of a scheduling process by the base station according to the second embodiment;

FIG. 9 is a diagram of an example of an operation of a wireless communications system according to a third embodiment;

FIG. 10 is a flowchart of an example of a process by the base station according to the third embodiment;

FIG. 11 is a flowchart of an example of a process by the terminal according to the third embodiment;

FIG. 12 is a diagram of an example of an operation of the wireless communications system according to a fourth embodiment;

FIG. 13 is a flowchart of an example of a process by the base station according to the fourth embodiment;

FIG. 14 is a diagram of an example of operation of the wireless communications system according to a fifth embodiment;

FIG. 15 is a diagram of an example of down-link transmission;

FIG. 16 is a diagram of another example of down-link transmission;

FIG. 17 is a diagram of an example of up-link transmission;

FIG. 18 is a diagram of another example of up-link transmission;

FIG. 20 is a diagram of an example of operation of the wireless communications system according to a sixth embodiment;

FIG. 21 is a flowchart of an example of a process of the down-link data transmission;

FIG. 22A is a diagram (part 1) of an example of operation of the wireless communications system according to a seventh embodiment;

FIG. 22B is a diagram (part 2) of the example of the operation of the wireless communications system according to the seventh embodiment;

FIG. 22C is a diagram (part 3) of the example of the operation of the wireless communications system according to the seventh embodiment;

FIG. 23A is a diagram (part 1) of another example of the operation of the wireless communications system according to the seventh embodiment;

FIG. 23B is a diagram (part 2) of the other example of operation of the wireless communications system according to the seventh embodiment;

FIG. 23C is a diagram (part 3) of the other example of operation of the wireless communications system according to the seventh embodiment;

DESCRIPTION OF THE INVENTION

Embodiments of a wireless communications system, a base station, and a terminal according to the present invention will be described in detail with reference to the accompanying drawings.

Figure 1:
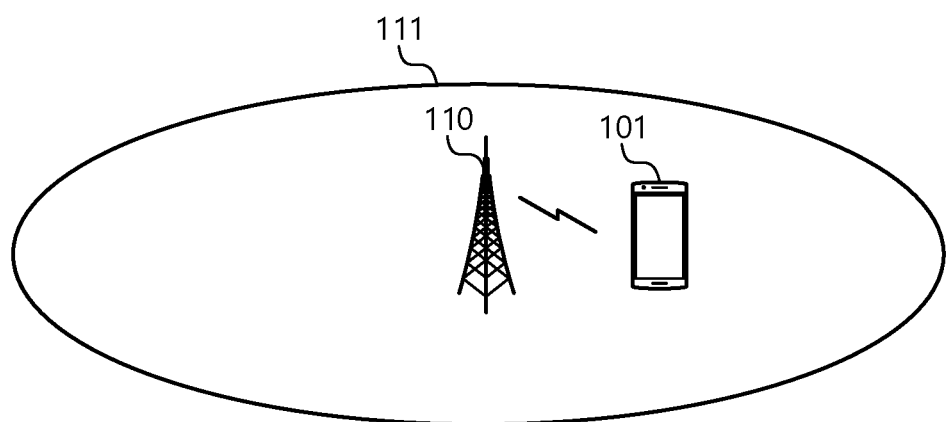
FIG. 1 is a diagram of an example of a wireless communications system according to a first embodiment.

FIG. 1 is a diagram of an example of a wireless communications system according to a first embodiment. As depicted in FIG. 1, a wireless communications system 100 according to the first embodiment includes a base station 110 and a terminal 101. A cell 111 is a cell formed by the base station 110. The terminal 101 is located within the area of the cell 111 and wirelessly communicates with the base station 110.

The base station 110 and the terminal 101 perform wireless communication of Long Term Evolution (LTE) for example. In this case, the base station 110 is an evolved Node B (eNB) of LTE for example. The terminal 101 is User Equipment (UE: user terminal) of LTE, for example.

The base station 110 and the terminal 101 wirelessly communicate with each other by using a first band dedicated to the system thereof and a second band shared by the system thereof and another wireless communications system. The first band is, for example, a licensed band carrier (LC). The second band is, for example, an unlicensed band carrier (UC).

For example, the second band is a band also used in a wireless local area network (LAN). Alternatively, the second band may be a band shared with another (another provider's) LTE system different from the wireless communications system 100, for example.

For example, in the wireless communications system 100, the first band is used for a primary component carrier (PCC) and a second band is used for a secondary component carrier (SCC).

Figure 2:
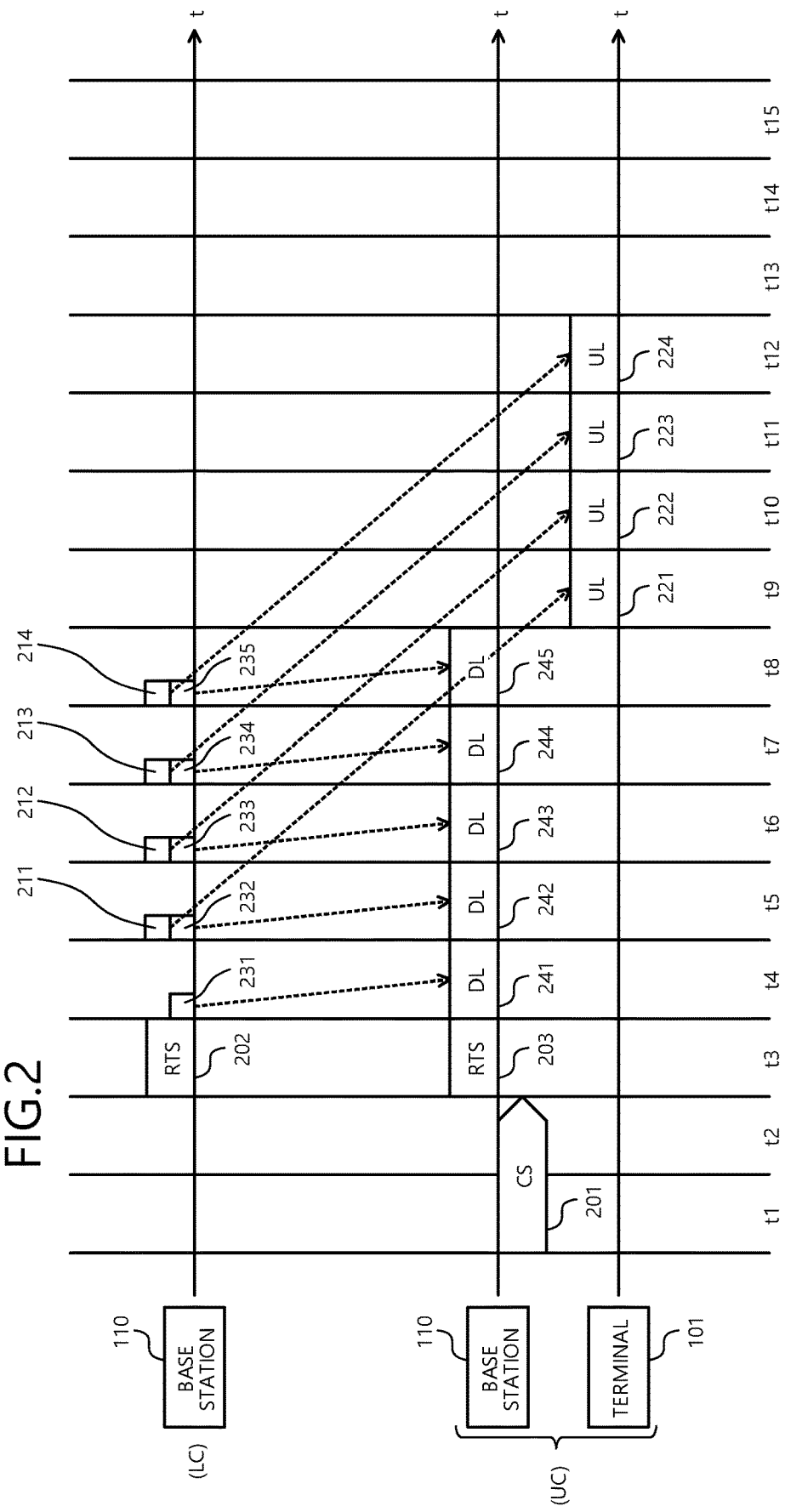
FIG. 2 is a diagram of an example of operation of the wireless communications system according to the first embodiment.

FIG. 2 is a diagram of an example of operation of the wireless communications system according to the first embodiment. In FIG. 2, a horizontal axis indicates time (e) in subframes. When assigning up-link (UL) transmission of the terminal 101 in the UC, the base station 110 performs a carrier sense (CS) 201 in the UC. In the example depicted in FIG. 2, as a result of the carrier sense 201, the base station 110 determines that an available resource exists in the UC.

In this case, the base station 110 transmits (broadcasts) through the LC, a Request-To-Send (RTS) signal 202, which is a request signal requesting data transmission from the base station 110, for performing resource reservation. Additionally, the base station 110 transmits through the UC, an RTS signal 203 for performing resource reservation to another LTE system (e.g., including a network of a different business operator). In the example depicted in FIG. 2, the RTS signals 202, 203 are transmitted in a subframe t3.

The base station 110 then transmits UL grants 211 to 214 to the terminal 101 through the LC in subframes t5 to t8. The UL grant 211 is a signal indicating permission for UL transmission from the terminal 101 after four subframes from the transmission of the UL grant 211. Similarly, the UL grants 212 to 214 are signals indicating permission for UL transmission from the terminal 101 after four subframes from the transmission of the UL grants 211 to 214, respectively.

For example, it is assumed that the base station 110 assigns subframes t9 to t12 to the UL transmission from the terminal 101. In this case, the base station 110 transmits the UL grants 211 to 214 to the terminal 101 in the subframes t5 to t8 four frames before. On the other hand, the terminal 101 performs UL transmissions 221 to 224 in the subframes t9 to t12 after four subframes from reception of the respective UL grants 211 to 214.

The base station 110 transmits DL assigns 231 to 235 indicating down-link (DL) transmission from the base station 110, in the subframes t4 to t8 between the subframe t3 in which the RTS signal 203 is transmitted and the subframes t9 to t12.

The base station 110 performs DL transmissions 241 to 245 through the UC in the subframes t4 to t8. Therefore, the base station 110 assigns the UL transmissions 221 to 224 continuously from the DL transmissions 241 to 245. The DL assigns are also referred to as DL assignments or DL grants.

The DL transmissions 241 to 245 are DL transmissions to at least one of the terminals connected to the base station 110. Any of the terminals connected to the base station 110 may be the terminal 101 or a terminal different from the terminal 101. The band (e.g., resource block) of the DL transmissions 241 to 245 may be, for example, the same band as the band of the UL transmissions 221 to 224 or a band including the band of the UL transmissions 221 to 224. Alternatively, the band of the DL transmissions 241 to 245 may be a band partially including the band of the UL transmissions 221 to 224.

This enables interrupts of the UC in the subframes t4 to t8 by a non-LTE system (e.g., a wireless LAN system) unable to receive the RTS signal 203 to be inhibited, for example. Therefore, even if the terminal 101 does not perform the carrier sense before the UL transmissions 221 to 224, interference with the UL transmissions 221 to 224 may be suppressed.

The base station 110 may not transmit the RTS signal 203. Also in this case, the DL transmissions 241 to 245 may inhibit interrupt of the UC in the subframes t4 to t8 by another LTE system, for example. Therefore, even if the terminal 101 does not perform the carrier sense before the UL transmissions 221 to 224, the interference with the UL transmissions 221 to 224 may be suppressed. In this case, the base station 110 may perform a DL transmission also in the subframe t3 to inhibit the interrupt to the UC in the subframe t3.

Figure 3:
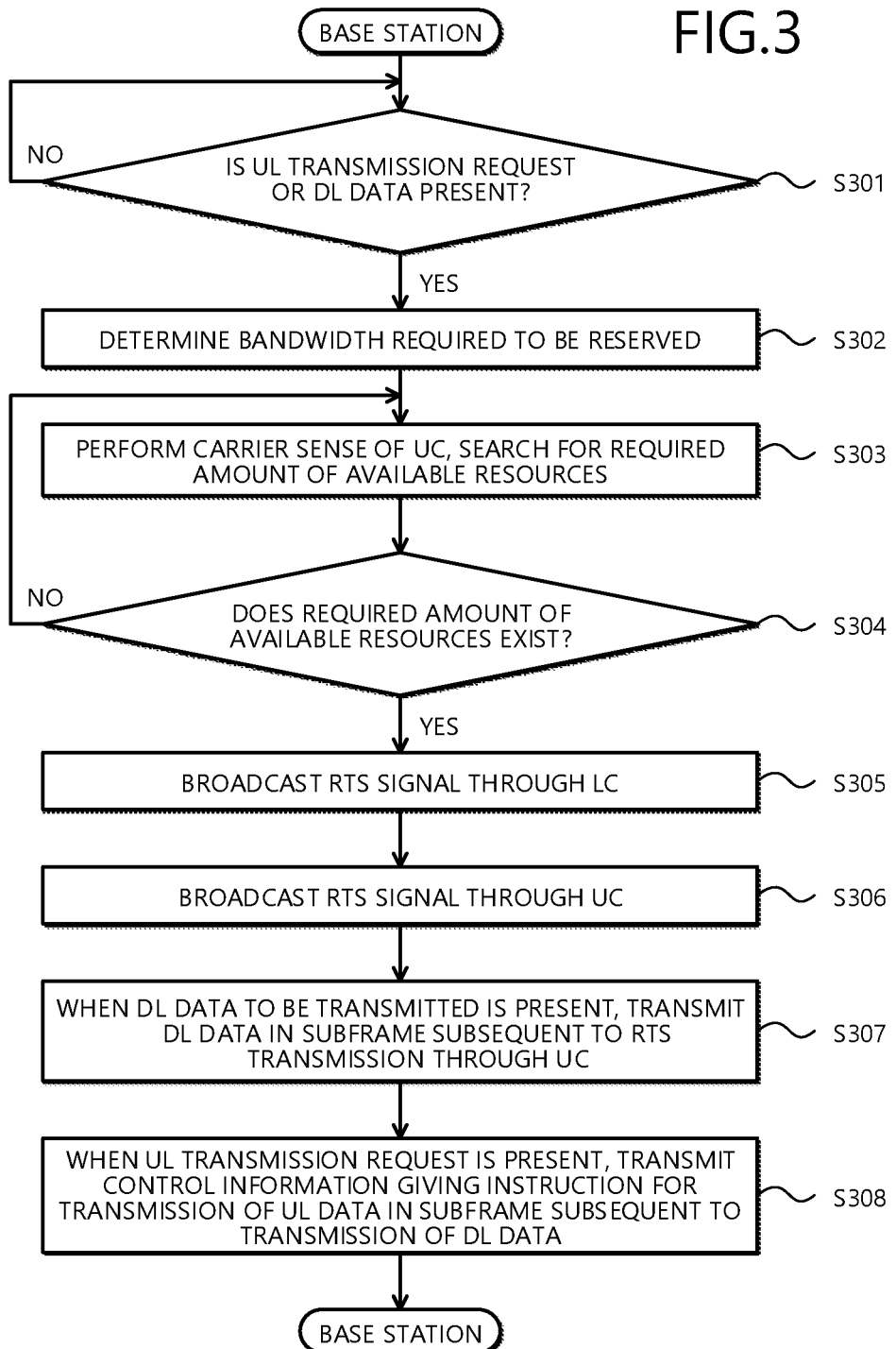
FIG. 3 is a flowchart of an example of a process by a base station according to the first embodiment.

FIG. 3 is a flowchart of an example of a process by the base station according to the first embodiment. The base station 110 according to the first embodiment repeatedly executes steps depicted in FIG. 3, for example. First, the base station 110 determines whether a UL transmission request or DL data is present (step S301). The UL transmission request is a request for UL transmission from the terminal 101. The DL data is data to be transmitted from the base station 110 to the terminal 101.

If neither the UL transmission request nor DL data is present at step S301 (step S301: NO), the base station 110 returns to step S301. If determining that the UL transmission request or the DL data is present (step S301: YES), the base station 110 determines a bandwidth required to be reserved for the generated UL transmission request or DL data (step S302). The determination at step S302 is made based on a size of UL data related to the UL transmission request or DL data, for example.

The base station 110 then performs a carrier sense of the UC to search for a required amount of available resources (step S303). Based on the result at step S303, the base station 110 determines whether a required amount of available resources exists that corresponds to the bandwidth determined at step S302 (step S304). If the required amount of available resources does not exist (step S304: NO), the base station 110 returns to step S303.

If the required amount of available resources exists at step S304 (step S304: YES), the base station 110 broadcasts the RTS signal through the LC (step S305). The base station 110 also broadcasts the RTS signal through the UC (step S306).

If the DL data to be transmitted is present, the base station 110 transmits the DL data in a subframe subsequent to the RTS transmission through the UC at step S306 (step S307). If the UL transmission request is present, the base station 110 transmits the control information (UL grant) giving an instruction for transmission of UL data in a subframe subsequent to the transmission of the DL data at step S307 (step S308) and terminates a series of operations.

Figure 4:
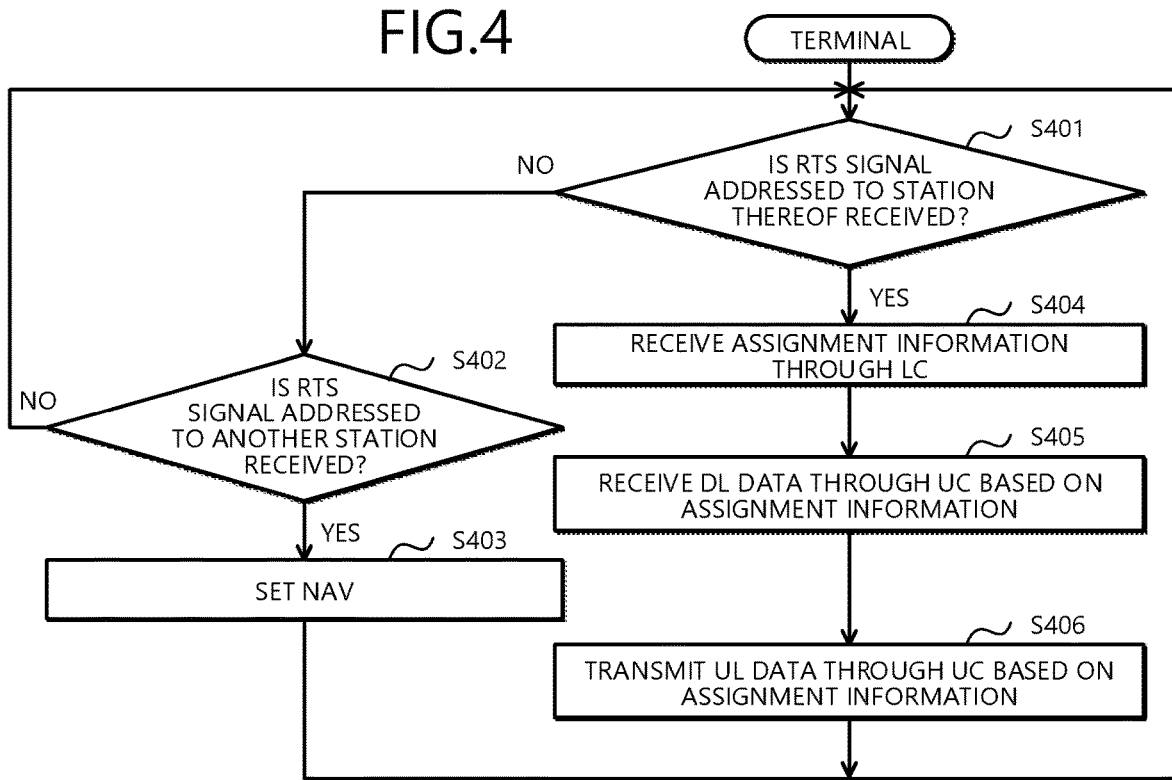
FIG. 4 is a flowchart of an example of a process by a terminal according to the first embodiment.

FIG. 4 is a flowchart of an example of a process by the terminal according to the first embodiment. The terminal 101 according to the first embodiment repeatedly executes steps depicted in FIG. 4, for example. First, the terminal 101 determines whether an RTS signal addressed to the station thereof is received (step S401). If no RTS signal addressed to the station thereof is received (step S401: NO), the terminal 101 determines whether an RTS signal addressed to another station is received (step S402).

If no RTS signal addressed to another station is received at step S402 (step S402: NO), the terminal 101 returns to step S401. If an RTS signal addressed to another station is received (step S402: YES), the terminal 101 sets a network allocation vector (NAV: transmission inhibition period) to the terminal 101 based on the received RTS signal (step S403) and returns to step S401.

If an RTS signal addressed to the station thereof is received at step S401 (step S401: YES), the terminal 101 receives assignment information through the LC from the base station 110 (step S404). The assignment information includes UL grants or DL assigns, for example.

The terminal 101 receives DL data through the UC based on the assignment information received at step S404 (step S405). The terminal 101 transmits UL data through the UC based on the assignment information received at step S404 (step S406) and returns to step S401.

Figure 5A:
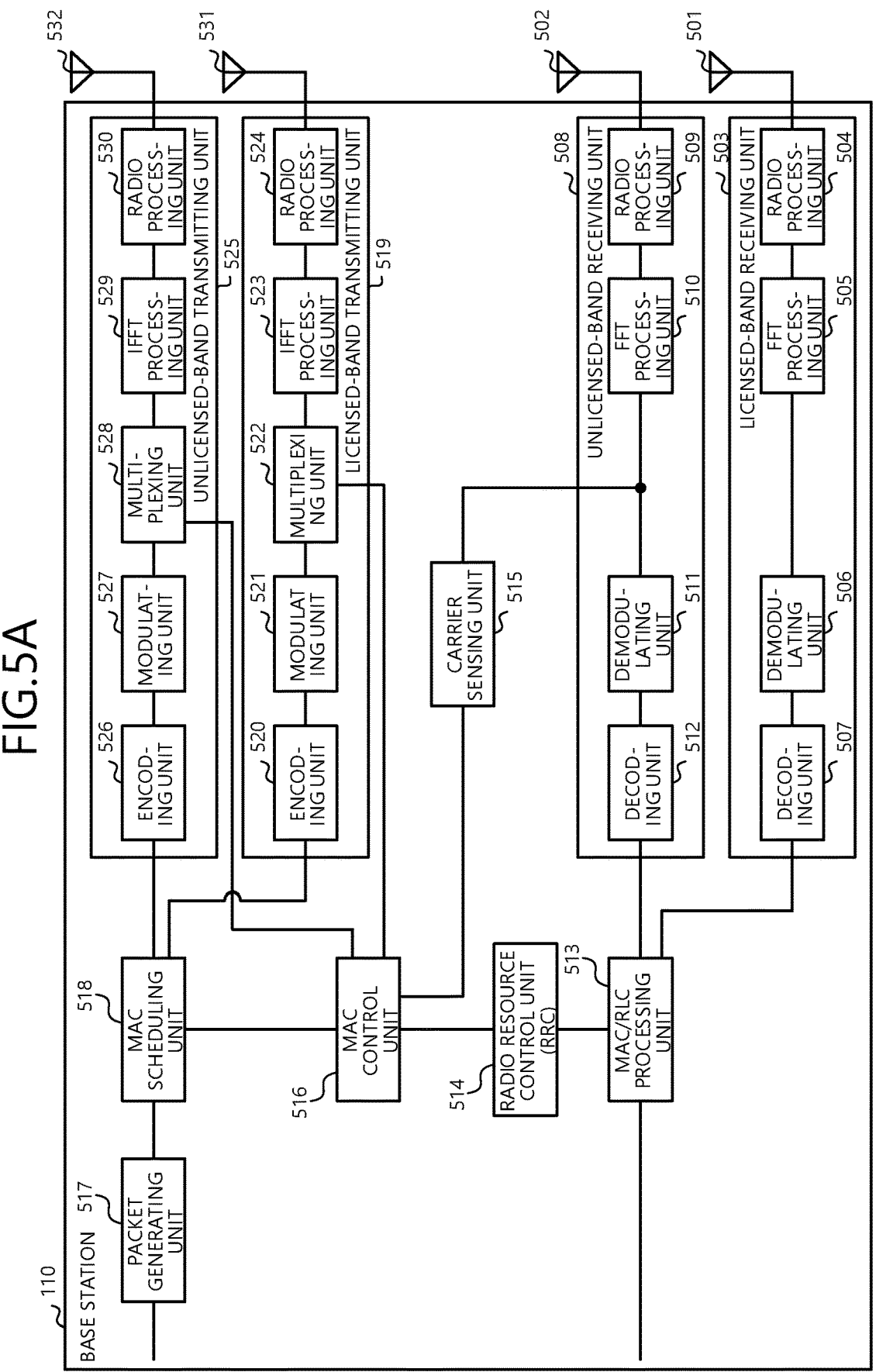
FIG. 5A is a diagram of an example of the base station according to the first embodiment.
Figure 5B:
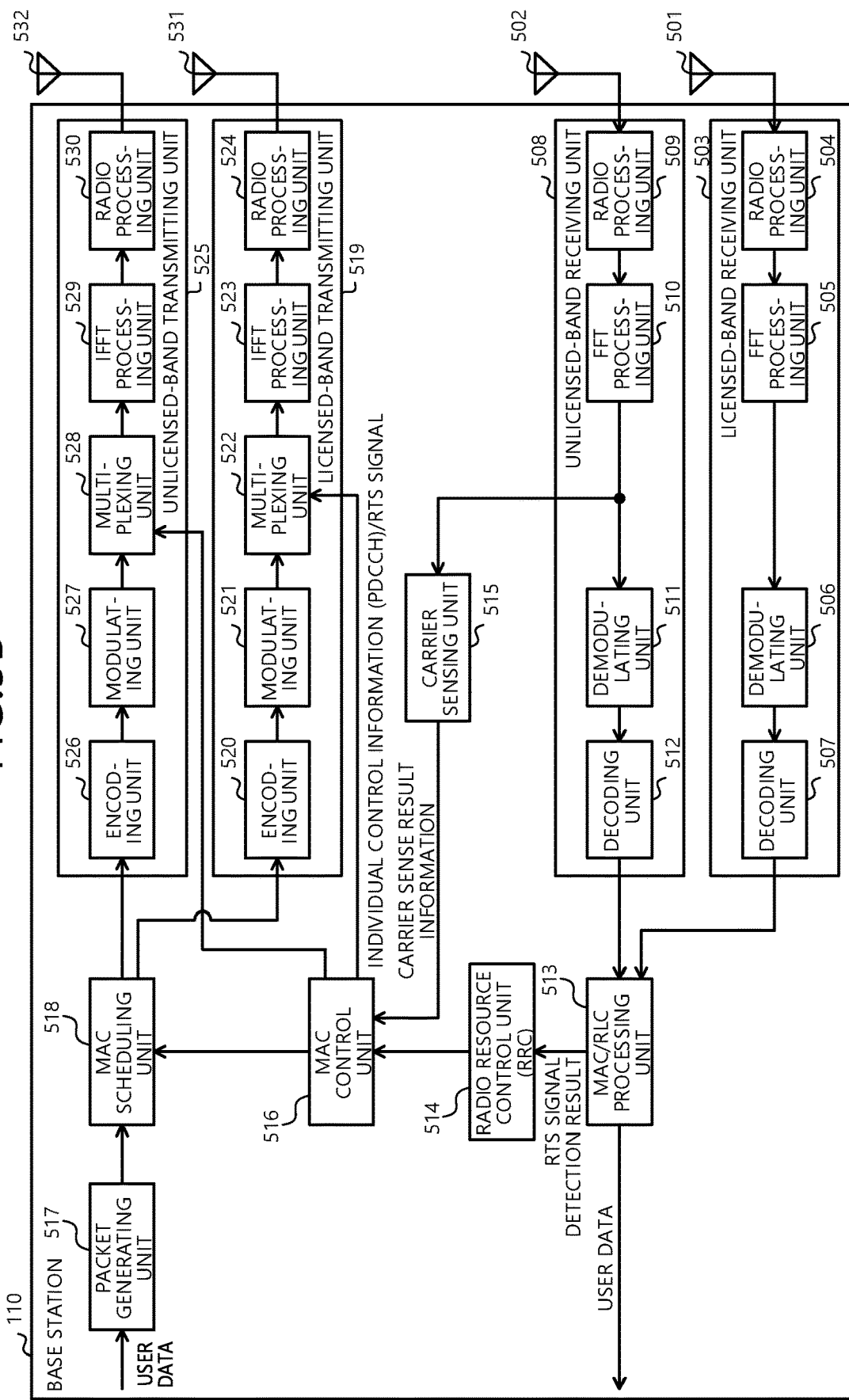
FIG. 5B is a diagram of an example of signal flow in the base station depicted in FIG. 5A.

FIG. 5A is a diagram of an example of a base station according to the first embodiment. FIG. 5B is a diagram of an example of signal flow in the base station depicted in FIG. 5A. The base station 110 according to the first embodiment may be implemented by the base station 110 depicted in FIGS. 5A and 5B, for example.

The base station 110 depicted in FIGS. 5A and 5B includes antennas 501, 502, a licensed-band receiving unit 503, an unlicensed-band receiving unit 508, a MAC/RLC processing unit 513, a radio resource control unit 514, and a carrier sensing unit 515. The base station 110 also includes a MAC control unit 516, a packet generating unit 517, a MAC scheduling unit 518, a licensed-band transmitting unit 519, an unlicensed-band transmitting unit 525, and antennas 531, 532.

Each of the antennas 501, 502 receives signals wirelessly transmitted from another wireless communications apparatus. The antennas 501 and 502 output received signals to the licensed-band receiving unit 503 and the unlicensed-band receiving unit 508, respectively.

The licensed-band receiving unit 503 executes a licensed-band reception process. For example, the licensed-band receiving unit 503 includes a radio processing unit 504, an FFT processing unit 505, a demodulating unit 506, and a decoding unit 507.

The radio processing unit 504 executes a radio process on the signal output from the antenna 501. The radio process of the radio processing unit 504 includes frequency conversion from a high-frequency band to a baseband, for example. The radio processing unit 504 outputs the signal subjected to the radio process to the FFT processing unit 505.

The FFT processing unit 505 executes a Fast Fourier Transform (FFT) process on the signal output from the radio processing unit 504. As a result, the signal is transformed from the time domain to the frequency domain. The FFT processing unit 505 outputs the signal subjected to the FFT process to the demodulating unit 506.

The demodulating unit 506 demodulates the signal output from the FFT processing unit 505. The demodulating unit 506 outputs a signal acquired from the demodulation to the decoding unit 507. The decoding unit 507 decodes the signal output from the demodulating unit 506. The decoding unit 507 outputs data acquired from the decoding to the MAC/RLC processing unit 513.

The unlicensed-band receiving unit 508 executes an unlicensed-band reception process. For example, the unlicensed-band receiving unit 508 includes a radio processing unit 509, an FFT processing unit 510, a demodulating unit 511, and a decoding unit 512.

The radio processing unit 509 executes a radio process on the signal output from the antenna 502. The radio process of the radio processing unit 509 includes frequency conversion from the high-frequency band to the baseband, for example. The radio processing unit 509 outputs the signal subjected to the radio process to the FFT processing unit 510.

The FFT processing unit 510 executes the FFT process of the signal output from the radio processing unit 509. As a result, the signal is transformed from the time domain to the frequency domain. The FFT processing unit 510 outputs the signal subjected to the FFT process to the demodulating unit 511 and the carrier sensing unit 515.

The demodulating unit 511 demodulates the signal output from the FFT processing unit 510. The demodulating unit 511 outputs to the decoding unit 512, the signal acquired from the demodulation. The decoding unit 512 decodes the signal output from the demodulating unit 511. The decoding unit 512 outputs to the MAC/RLC processing unit 513, data acquired from the decoding.

The MAC/RLC processing unit 513 executes respective processes of a media access control (MAC) layer and a radio link control (RLC) layer based on the data output from the decoding unit 507. The MAC/RLC processing unit 513 outputs data acquired from the processes of the layers. The signal output from the MAC/RLC processing unit 513 is input to a processing unit on a higher layer of the base station 110, for example. The MAC/RLC processing unit 513 also outputs to the radio resource control unit 514, control information such as an RTS signal detection result included in the data acquired from the processes of the layers.

The radio resource control unit 514 provides radio resource control based on the control information output from the MAC/RLC processing unit 513. This radio resource control is a process of a radio resource control (RRC) layer. The radio resource control unit 514 outputs control information based on the radio resource control to the MAC control unit 516.

The carrier sensing unit 515 performs a carrier sense based on an unlicensed-band signal output from the FFT processing unit 510. The carrier sensing unit 515 outputs carrier sense result information indicating a result of the carrier sense to the MAC control unit 516.

The MAC control unit 516 controls the MAC layer based on the control information output from the radio resource control unit 514 and the carrier sense result information output from the carrier sensing unit 515. The MAC control unit 516 outputs to a multiplexing unit 522, individual control information and an RTS signal for the terminal 101 based on the control of the MAC layer. The individual control information is a physical downlink control channel (PDCCH), for example.

The MAC control unit 516 outputs to a multiplexing unit 528, a data demodulation reference signal (DMRS), a dummy signal, an RTS signal, etc. based on the control of the MAC layer. The MAC control unit 516 outputs control information based on the control of the MAC layer to the MAC scheduling unit 518.

The packet generating unit 517 generates a packet including user data output from the higher layer of the base station 110. The packet generating unit 517 outputs the generated packet to the MAC scheduling unit 518.

The MAC scheduling unit 518 performs scheduling of the MAC layer for the packet output from the packet generating unit 517 based on the control information output from the MAC control unit 516. The MAC scheduling unit 518 outputs the packet based on the result of the scheduling to the licensed-band transmitting unit 519 and the unlicensed-band transmitting unit 525.

The licensed-band transmitting unit 519 executes a licensed-band transmission process. For example, the licensed-band transmitting unit 519 includes an encoding unit 520, a modulating unit 521, the multiplexing unit 522, an IFFT processing unit 523, and a radio processing unit 524.

The encoding unit 520 encodes the packet output from the MAC scheduling unit 518. The encoding unit 520 outputs the encoded packet to the modulating unit 521. The modulating unit 521 performs modulation based on the packet output from the encoding unit 520. The modulating unit 521 outputs a signal acquired from the modulation to the multiplexing unit 522.

The multiplexing unit 522 multiplexes the individual control information and the RTS signal output from the MAC control unit 516 with the signal output from the modulating unit 521. The multiplexing unit 522 outputs a signal acquired from the multiplexing to the IFFT processing unit 523.

The IFFT processing unit 523 executes an Inverse Fast Fourier Transform (IFFT) process on the signal output from the multiplexing unit 522. As a result, the signal is transformed from the frequency domain to the time domain. The IFFT processing unit 523 outputs the signal subjected to the IFFT process to the radio processing unit 524.

The radio processing unit 524 executes a radio process on the signal output from the IFFT processing unit 523. The radio process of the radio processing unit 524 includes frequency conversion from the baseband to the high-frequency band, for example. The radio processing unit 524 outputs the signal subjected to the radio process to the antenna 531.

The unlicensed-band transmitting unit 525 executes an unlicensed-band transmission process. For example, the unlicensed-band transmitting unit 525 includes an encoding unit 526, a modulating unit 527, the multiplexing unit 528, an IFFT processing unit 529, and a radio processing unit 530.

The encoding unit 526 encodes the packet output from the MAC scheduling unit 518. The encoding unit 526 outputs the encoded packet to the modulating unit 527. The modulating unit 527 performs modulation based on the packet output from the encoding unit 526. The modulating unit 527 outputs a signal acquired from the modulation to the multiplexing unit 528.

The multiplexing unit 528 multiplexes the individual control information and the RTS signal output from the MAC control unit 516 with the signal output from the modulating unit 527. The multiplexing unit 528 outputs a signal acquired from the multiplexing to the IFFT processing unit 529.

The IFFT processing unit 529 executes the IFFT process of the signal output from the multiplexing unit 528. As a result, the signal is transformed from the frequency domain to the time domain. The IFFT processing unit 529 outputs the signal subjected to the IFFT process to the radio processing unit 530.

The radio processing unit 530 executes the radio process of the signal output from the IFFT processing unit 529. The radio process of the radio processing unit 530 includes frequency conversion from the baseband to the high-frequency band, for example. The radio processing unit 530 outputs the signal subjected to the radio process to the antenna 532.

The antenna 531 wirelessly transmits the signal output from the radio processing unit 524 to another wireless communications apparatus. The antenna 532 wirelessly transmits the signal output from the radio processing unit 530 to another wireless communications apparatus.

FIG. 5C is a diagram of an example of a hardware configuration of an eNB. FIG. 5D is a diagram of an example of signal flow in the hardware configuration depicted in FIG. 5A. The base station 110 may be implemented by a wireless communications apparatus 550 depicted in FIGS. 5C and 5D, for example.

The wireless communications apparatus 550 includes, for example, a transmission/reception antenna 551, an amplifier 552, a multiplying unit 553, an analog/digital converter 554, a processor 555, and a memory 556. The wireless communications apparatus 550 also includes a digital/analog converter 557, a multiplying unit 558, an amplifier 559, and an oscillator 560. The wireless communications apparatus 550 may include an interface performing wired communication with an external communication apparatus.

The transmission/reception antenna 551 receives a signal wirelessly transmitted from a vicinity of the eNB thereof and outputs the received signal to the amplifier 552. The transmission/reception antenna 551 transmits a signal output from the amplifier 559 to a vicinity of the eNB thereof.

The amplifier 552 amplifies the signal output from the transmission/reception antenna 551. The amplifier 552 outputs the amplified signal to the multiplying unit 553. The multiplying unit 553 multiplies the signal output from the amplifier 552 by a clock signal output from the oscillator 560 to perform the frequency conversion from the high-frequency band to the baseband. The multiplying unit 553 outputs the frequency-converted signal to the analog/digital converter 554.

The analog/digital converter 554 (A/D) is an analog/digital converter (ADC) converting the signal output from the multiplying unit 553, from an analog signal into a digital signal. The analog/digital converter 554 outputs the signal converted into the digital single to the processor 555.

The processor 555 provides the overall control of the wireless communications apparatus 550. The processor 555 may be implemented by a central processing unit (CPU) or a digital signal processor (DSP), for example. The processor 555 executes a reception process of the signal output from the analog/digital converter 554. The processor 555 executes a transmission process of generating a signal to be transmitted by the eNB thereof and outputting the generated signal to the digital/analog converter 557.

The memory 556 includes a main memory and an auxiliary memory, for example. The main memory is a random access memory (RAM), for example. The main memory is used as a work area of the processor 555. The auxiliary memory is a non-volatile memory such as a magnetic disk and a flash memory, for example. In the auxiliary memory, various programs for operating the processor 555 are stored. The programs stored in the auxiliary memory are loaded to the main memory and executed by the processor 555. In the auxiliary memory, for example, various predefined thresholds are stored.

The digital/analog converter 557 is a digital/analog converter (DAC) converting the signal output from the processor 555, from a digital signal into an analog signal. The digital/analog converter 557 outputs the signal converted into the analog single to the multiplying unit 558.

The multiplying unit 558 multiplies the signal output from the digital/analog converter 557 by the clock signal output from the oscillator 560 to perform the frequency conversion from the baseband to the high-frequency band. The multiplying unit 558 outputs the frequency-converted signal to the amplifier 559. The amplifier 559 amplifies the signal output from the digital/analog converter 557. The amplifier 559 outputs the amplified signal to the transmission/reception antenna 551.

The oscillator 560 oscillates the clock signal (AC signal of continuous wave) of a predetermined frequency. The oscillator 560 outputs the oscillated clock signal to the multiplying units 553, 558.

The antennas 501, 502, 531, 532 depicted in FIGS. 5A and 5B may be implemented by the transmission/reception antenna 551, for example. The radio processing units 504, 509, 524, 530 depicted in FIGS. 5A and 5B may be implemented by the amplifier 552, the multiplying unit 553, the analog/digital converter 554, the digital/analog converter 557, the multiplying unit 558, the amplifier 559, and the oscillator 560, for example. The other constituent elements depicted in FIGS. 5A and 5B may be implemented by the processor 555 and the memory 556, for example.

Figure 6A:
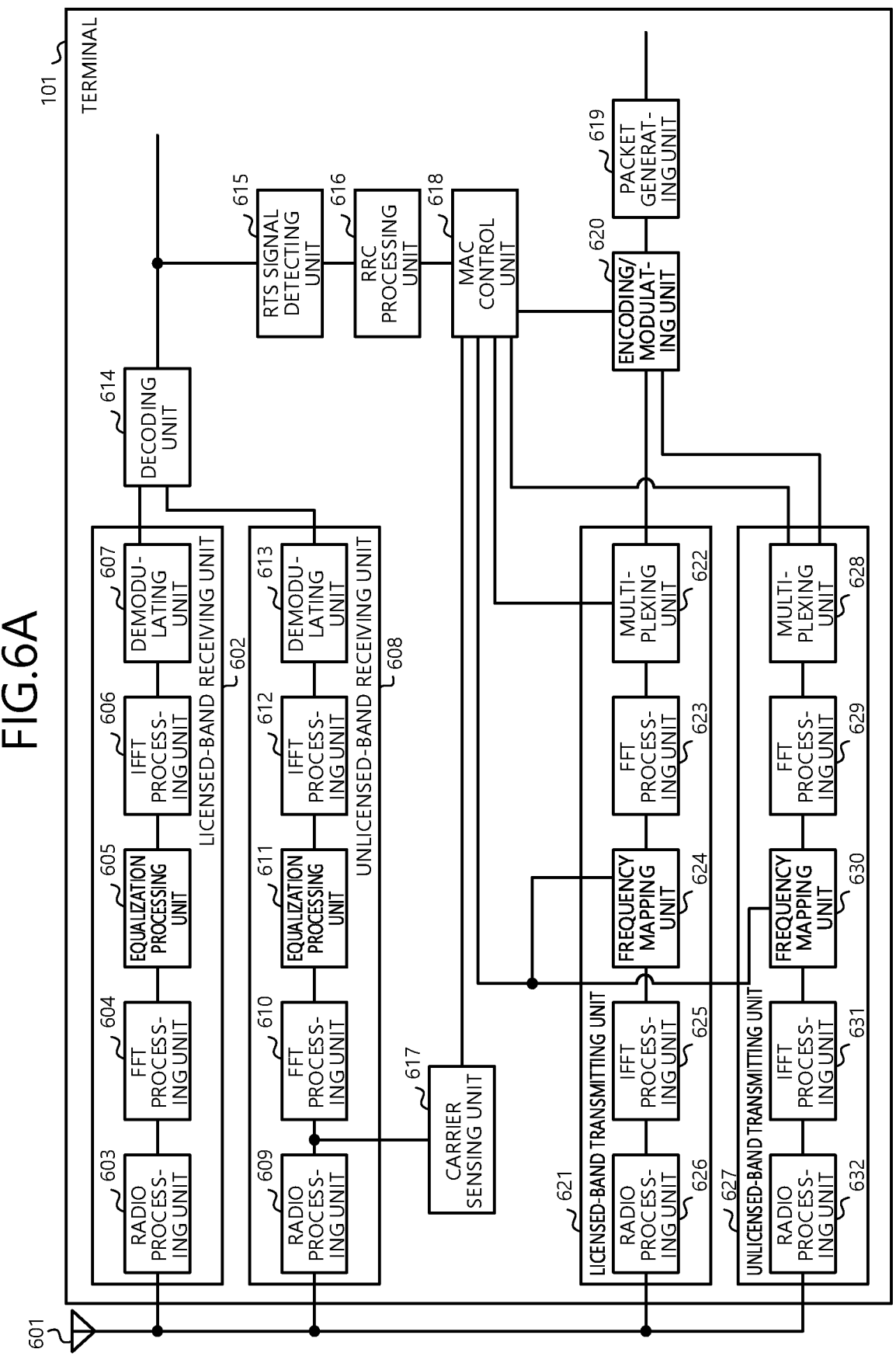
FIG. 6A is a diagram of an example of the terminal according to the first embodiment.
Figure 6B:
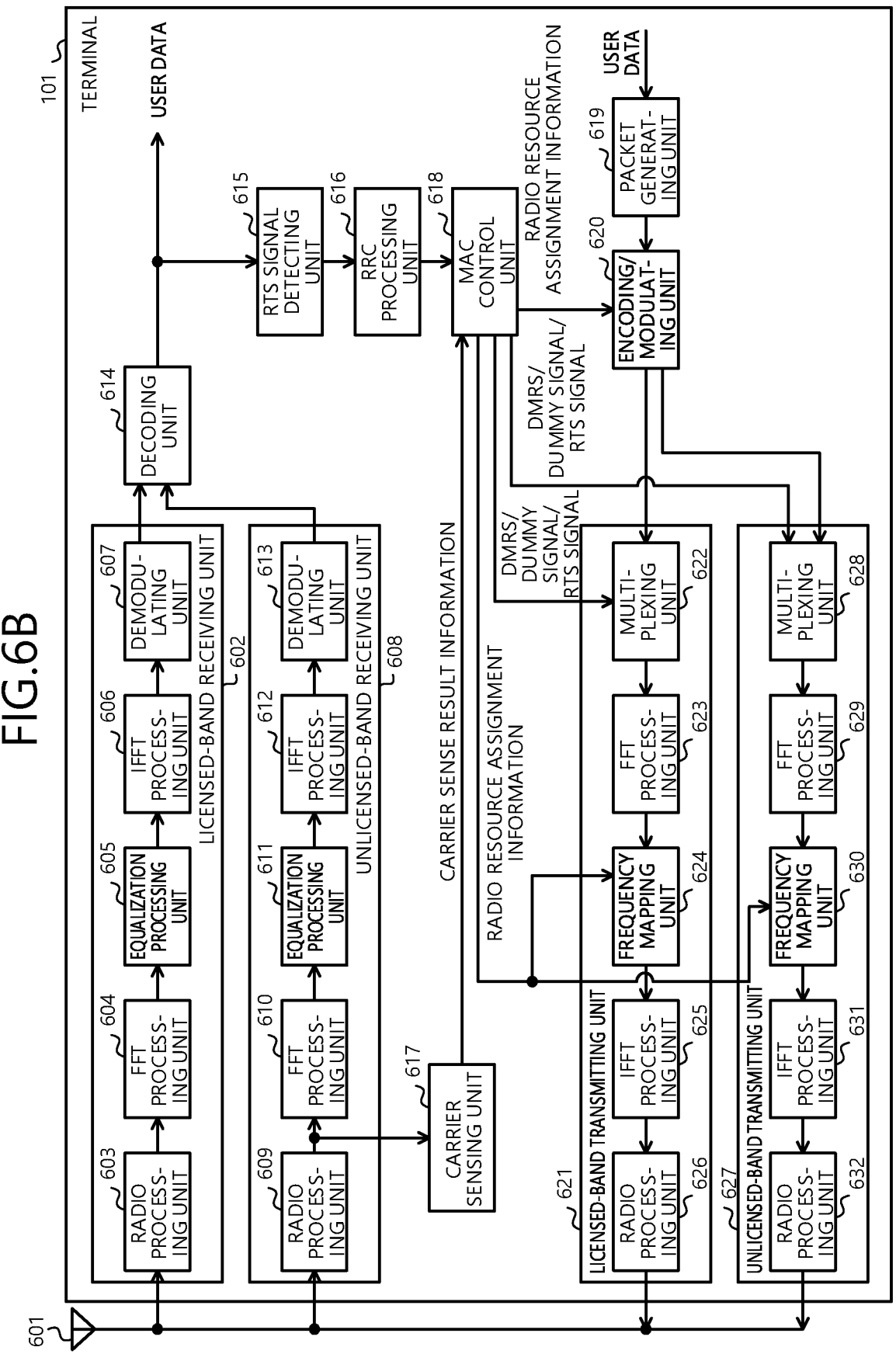
FIG. 6B is a diagram of an example of signal flow in the terminal depicted in FIG. 6A.

FIG. 6A is a diagram of an example of a terminal according to the first embodiment. FIG. 6B is a diagram of an example of signal flow in the terminal depicted in FIG. 6A. The terminal 101 according to the first embodiment may be implemented by the terminal 101 depicted in FIGS. 6A and 6B, for example.

The terminal 101 depicted in FIGS. 6A and 6B includes an antenna 601, a licensed-band receiving unit 602, an unlicensed-band receiving unit 608, a decoding unit 614, an RTS signal detecting unit 615, an RRC processing unit 616, and a carrier sensing unit 617. The terminal 101 also includes a MAC control unit 618, a packet generating unit 619, an encoding/modulating unit 620, a licensed-band transmitting unit 621, and an unlicensed-band transmitting unit 627.

The antenna 601 receives a signal wirelessly transmitted from another wireless communications apparatus. The antenna 601 outputs the received signal to the licensed-band receiving unit 602 and the unlicensed-band receiving unit 608. The antenna 601 wirelessly transmits signals output from the licensed-band transmitting unit 621 and the unlicensed-band transmitting unit 627 to another wireless communications apparatus.

The licensed-band receiving unit 602 executes a licensed-band reception process. For example, the licensed-band receiving unit 602 includes a radio processing unit 603, an FFT processing unit 604, an equalization processing unit 605, an IFFT processing unit 606, and a demodulating unit 607.

The radio processing unit 603 executes the radio process on the signal output from the antenna 601. The radio process of the radio processing unit 603 includes frequency conversion from the high-frequency band to the baseband, for example. The radio processing unit 603 outputs the signal subjected to the radio process to the FFT processing unit 604.

The FFT processing unit 604 executes the FFT process on the signal output from the radio processing unit 603. As a result, the signal is transformed from the time domain to the frequency domain. The FFT processing unit 604 outputs the signal subjected to the FFT process to the equalization processing unit 605. The equalization processing unit 605 executes an equalization process on the signal output from the FFT processing unit 604. The equalization processing unit 605 outputs the signal subjected to the equalization process to the IFFT processing unit 606.

The IFFT processing unit 606 executes the IFFT process on the signal output from the equalization processing unit 605. As a result, the signal is transformed from the frequency domain to the time domain. The IFFT processing unit 606 outputs the signal subjected to the IFFT process to the demodulating unit 607. The demodulating unit 607 demodulates the signal output from the IFFT processing unit 606. The demodulating unit 607 outputs a signal acquired from the demodulation to the decoding unit 614.

The unlicensed-band receiving unit 608 executes an unlicensed-band reception process. For example, the unlicensed-band receiving unit 608 includes a radio processing unit 609, an FFT processing unit 610, an equalization processing unit 611, an IFFT processing unit 612, and a demodulating unit 613.

The radio processing unit 609 executes the radio process on the signal output from the antenna 601. The radio process of the radio processing unit 609 includes frequency conversion from the high-frequency band to the baseband, for example. The radio processing unit 609 outputs the signal subjected to the radio process to the FFT processing unit 610 and the carrier sensing unit 617.

The FFT processing unit 610 executes the FFT process on the signal output from the radio processing unit 609. As a result, the signal is transformed from the time domain to the frequency domain. The FFT processing unit 610 outputs the signal subjected to the FFT process to the equalization processing unit 611. The equalization processing unit 611 executes the equalization process of the signal output from the FFT processing unit 610. The equalization processing unit 611 outputs the signal subjected to the equalization process to the IFFT processing unit 612.

The IFFT processing unit 612 executes the IFFT process on the signal output from the equalization processing unit 611. As a result, the signal is transformed from the frequency domain to the time domain. The IFFT processing unit 612 outputs the signal subjected to the IFFT process to the demodulating unit 613. The demodulating unit 613 demodulates the signal output from the IFFT processing unit 612. The demodulating unit 613 outputs a signal acquired from the demodulation to the decoding unit 614.

The decoding unit 614 decodes the signals output from the licensed-band receiving unit 602 and the unlicensed-band receiving unit 608. The decoding unit 614 outputs data acquired from the decoding. The data output from the decoding unit 614 is input to a processing unit on the higher layer of the terminal 101 and the RTS signal detecting unit 615, for example. The data output from the decoding unit 614 includes user data, for example.

The RTS signal detecting unit 615 detects the RTS signal transmitted from another wireless communications apparatus and included in the data output from the decoding unit 614. The RTS signal detecting unit 615 outputs a detection result of the RTS signal to the RRC processing unit 616.

The RRC processing unit 616 executes a process of the RRC layer based on the RTS signal output from the RTS signal detecting unit 615. The RRC processing unit 616 outputs a process result of the RRC layer to the MAC control unit 618.

The carrier sensing unit 617 performs a carrier sense based on the signal output from the radio processing unit 609. The carrier sensing unit 617 outputs carrier sense result information indicating a result of the carrier sense to the MAC control unit 618.

The MAC control unit 618 executes a process of the MAC layer based on the process result output from the RRC processing unit 616 and the carrier sense result information output from the carrier sensing unit 617. The MAC control unit 618 outputs the DMRS, the dummy signal, the RTS signal, etc. for the terminal 101 based on the process of the MAC layer to multiplexing units 622, 628.

The MAC control unit 618 outputs radio resource assignment information based on the process of the MAC layer to frequency mapping units 624, 630. The MAC control unit 618 outputs radio resource assignment information based on the process of the RRC layer by the RRC processing unit 616 to the encoding/modulating unit 620. The MAC control unit 618 confirms available radio resources with which the terminal 101 performs communications, based on the carrier sense result information output from the carrier sensing unit 617.

The packet generating unit 619 generates a packet including the user data output from the higher layer of the terminal 101. The packet generating unit 619 outputs the generated packet to the encoding/modulating unit 620.

The encoding/modulating unit 620 encodes and demodulates the packet output from the packet generating unit 619. The encoding/modulating unit 620 outputs the signal acquired from the encoding and demodulation to the licensed-band transmitting unit 621 or the unlicensed-band transmitting unit 627 based on the radio resource assignment information output from the MAC control unit 618.

The licensed-band transmitting unit 621 executes a licensed-band transmission process. For example, the licensed-band transmitting unit 621 includes the multiplexing unit 622, an FFT processing unit 623, the frequency mapping unit 624, an IFFT processing unit 625, and a radio processing unit 626. The multiplexing unit 622 multiplexes the signals output from the MAC control unit 618 and the signal output from the encoding/modulating unit 620. The multiplexing unit 622 outputs a signal acquired from the multiplexing to the FFT processing unit 623.

The FFT processing unit 623 executes the FFT process on the signal output from the multiplexing unit 622. As a result, the signal is transformed from the time domain to the frequency domain. The FFT processing unit 623 outputs the signal subjected to the FFT process to the frequency mapping unit 624. The frequency mapping unit 624 performs frequency mapping of the signal output from the FFT processing unit 623 based on the radio resource assignment information output from the MAC control unit 618. The frequency mapping unit 624 outputs the signal subjected to the frequency mapping to the IFFT processing unit 625.

The IFFT processing unit 625 executes the IFFT process of the signal output from the frequency mapping unit 624. As a result, the signal is transformed from the frequency domain to the time domain. The IFFT processing unit 625 outputs the signal subjected to the IFFT process to the radio processing unit 626. The radio processing unit 626 executes the radio process on the signal output from the IFFT processing unit 625. The radio process of the radio processing unit 626 includes frequency conversion from the baseband to the high-frequency band, for example. The radio processing unit 626 outputs the signal subjected to the radio process to the antenna 601.

The unlicensed-band transmitting unit 627 executes an unlicensed-band transmission process. For example, the licensed-band transmitting unit 627 includes the multiplexing unit 628, an FFT processing unit 629, the frequency mapping unit 630, an IFFT processing unit 631, and a radio processing unit 632. The multiplexing unit 628 multiplexes the signals output from the MAC control unit 618 and the signal output from the encoding/modulating unit 620. The multiplexing unit 628 outputs a signal acquired from the multiplexing to the FFT processing unit 629.

The FFT processing unit 629 executes the FFT process on the signal output from the multiplexing unit 628. As a result, the signal is transformed from the time domain to the frequency domain. The FFT processing unit 629 outputs the signal subjected to the FFT process to the frequency mapping unit 630. The frequency mapping unit 630 performs frequency mapping of the signal output from the FFT processing unit 629 based on the radio resource assignment information output from the MAC control unit 618. The frequency mapping unit 630 outputs the signal subjected to the frequency mapping to the IFFT processing unit 631.

The IFFT processing unit 631 executes the IFFT process on the signal output from the frequency mapping unit 630. As a result, the signal is transformed from the frequency domain to the time domain. The IFFT processing unit 631 outputs the signal subjected to the IFFT process to the radio processing unit 632. The radio processing unit 632 executes the radio process on the signal output from the IFFT processing unit 631. The radio process of the radio processing unit 632 includes frequency conversion from the baseband to the high-frequency band, for example. The radio processing unit 632 outputs the signal subjected to the radio process to the antenna 601.

Although the same antenna 601 is used for wireless transmission and wireless reception in the description of the example depicted in FIGS. 6A and 6B, an antenna for wireless transmission and an antenna for wireless reception may be disposed on the terminal 101.

The terminal 101 may be implemented by the wireless communications apparatus 550 depicted in FIGS. 5C and 5D, for example. In this case, the wireless communications apparatus 550 may omit an interface performing wired communication with an external communication apparatus.

The antenna 601 depicted in FIGS. 6A and 6B may be implemented by the transmission/reception antenna 551, for example. The radio processing units 603, 609, 626, 632 depicted in FIGS. 6A and 6B may be implemented by the amplifier 552, the multiplying unit 553, the analog/digital converter 554, the digital/analog converter 557, the multiplying unit 558, the amplifier 559, and the oscillator 560, for example. The other constituent elements depicted in FIGS. 6A and 6B may be implemented by the processor 555 and the memory 556, for example.

For example, a time difference of k subframes (k=4 in LTE) conventionally exists between RTS packet transmission and UL transmission, and this leads to problems of the radio resources wasted during this period and the interrupt by another system such as a wireless LAN system.

In this regard, according to the first embodiment, when transmitting through the LC, a control signal permitting the UL transmission from the terminal 101 to the base station 110 through the UC, the base station 110 may continuously send out DL data (radio waves) of the UC during the period until the UL transmission by the terminal 101.

As a result, the interrupt by another system may be suppressed during the period until the UL transmission by the terminal 101 so as to suppress the interference with the UL transmission by the terminal 101. Additionally, by transmitting the DL data of the UC during the period until the UL transmission by the terminal 101, the wasting of radio resources may be suppressed during the period until the UL transmission by the terminal 101. Therefore, communications may be made more efficient.

A second embodiment will be described in terms of portions different from the first embodiment.

FIG. 7 is a diagram of an example of scheduling by a base station according to the second embodiment. In FIG. 7, a horizontal direction indicates a time (t) in subframes and a depth direction indicates a frequency (f) of the UC. The base station 110 according to the second embodiment performs the DL transmission preceding the UL transmission as is in the first embodiment.

In the example depicted in FIG. 7, it is assumed that the base station 110 assigns UL transmissions 711 to 714 of the terminal 101 to a time resource T2 corresponding to four subframes, for example. In this case, the base station 110 assigns DL transmissions 721 to 724 of the base station 110 to a time resource T1 corresponding to four subframes immediately before the time resource T2.

In this case, as depicted in FIG. 7, the base station 110 performs the scheduling such that even when an amount of DL data to be transmitted is small relative to the time resource T1 corresponding to four subframes, the DL data is assigned as transmission having the length of four subframes. This scheduling may be performed as transmission-time-interval (TTI) bundling or scheduling for each subframe, for example.

In the example depicted in FIG. 7, the base station 110 may assign the DL transmissions 721 to 724 to the same band as the band (band F1) of the UL transmissions 711 to 714 so as to set the DL transmissions 721 to 724 as transmission having the length of four subframes.

The band of the DL transmissions 721 to 724 may be a band at least partially including the band (band F1) of the UL transmissions 711 to 714.

FIG. 8 is a flowchart of an example of a scheduling process by the base station according to the second embodiment. The base station 110 according to the second embodiment executes steps depicted in FIG. 8 as a UL scheduling process in the UC, for example.

First, the base station 110 determines a bandwidth B of a required radio resource necessary for UL data transmission requested from a terminal (step S801). The base station 110 reads data having a size N transmittable with a radio resource of B×4 subframes from a DL data buffer storing DL data (step S802). The reading at step S802 is performed by using a required modulation and coding scheme (MCS).

The base station 110 executes a process at step S803 for each of the four subframes to be scheduled. Specifically, the base station 110 cuts out data corresponding to one subframe (size N/4) from the data read at step S802 and schedules the data for a radio resource of B×1 subframe (step S803). At step S803, the base station 110 uses a rate matching function of LTE to map modulated data without a gap to a wireless resource that is an assignment object.

As described above, according to the second embodiment, in the period until the UL transmission by the terminal 101, the base station 110 may continuously send out from the base station 110 to the terminal 101, the DL data (radio wave) scheduled to have the data length made equal to the length of the period in the assignment band of the UL transmission.

As a result, the effect according to the first embodiment is produced and, even if the DL data from the base station 110 to the terminal 101 is small, the DL data may be sent out continuously during the period until the UL transmission by the terminal 101, so as to suppress the interrupt by another system.

A third embodiment will be described in terms of portions different from the first embodiment.

FIG. 9 is a diagram of an example of an operation of a wireless communications system according to the third embodiment. In FIG. 9, the same portions as those depicted in FIG. 2 are denoted by the same reference numerals used in FIG. 2 and will not be described. In the example depicted in FIG. 9, the base station 110 performs the carrier sense 201 in the subframes t3, t4, and assigns the subframes t9 to T13 to the UL transmission from the terminal 101.

In this case, the base station 110 transmits the UL grants 211 to 215 to the terminal 101 in the subframes t5 to t9. On the other hand, the terminal 101 performs UL transmissions 221 to 225 in the subframes t9 to t13 after four subframes from the reception of the respective UL grants 211 to 215.

The base station 110 transmits RTS signals 901 to 904 having the length of four subframes through the UC in the subframes t5 to t8. The band (e.g., resource block) of the RTS signals 901 to 904 may be, for example, the same band as the band of the UL transmissions 221 to 225 or a band including the band of the UL transmissions 221 to 225. Alternatively, the band of the RTS signals 901 to 904 may be a band partially including the band of the UL transmissions 221 to 225.

This enables the inhibition of interrupt in the subframes t5 to t8 by a non-LTE system (e.g., wireless LAN system) unable to receive the RTS signal 901, for example. Therefore, even if the terminal 101 does not perform the carrier sense before the UL transmissions 221 to 225, the interference with the UL transmissions 221 to 225 may be suppressed.

The base station 110 may transmit the RTS signal 202 through the LC as depicted in FIG. 2 before transmitting the UL grants 211 to 215.

FIG. 10 is a flowchart of an example of a process by the base station according to the third embodiment. The base station 110 according to the third embodiment repeatedly executes steps depicted in FIG. 10, for example. First, the base station 110 determines whether a UL transmission request is present (step S1001). If the UL transmission is not present (step S1001: NO), the base station 110 returns to step S1001. If the UL transmission request is present (step S1001: YES), the base station 110 determines a bandwidth required to be reserved for the generated UL transmission request (step S1002).

The base station 110 then performs a carrier sense of the UC to search for a required amount of available resources (step S1003). Based on the result at step S1003, the base station 110 determines whether a required amount of available resources exists that corresponds to the bandwidth determined at step S1002 (step S1004). If the required amount of available resources does not exist (step S1004: NO), the base station 110 returns to step S1003.

If the required amount of available resources exists at step S1004 (step S1004: YES), the base station 110 broadcasts the RTS signal through the LC (step S1005). The base station 110 then broadcasts the RTS signal having the length of four subframes through the UC (step S1006). The base station 110 transmits the control information (UL grant) giving an instruction for transmission of UL data in a subframe subsequent to the RTS transmission at step S1006 (step S1007) and terminates a series of operations.

FIG. 11 is a flowchart of an example of a process by the terminal according to the third embodiment. The terminal 101 according to the third embodiment repeatedly executes steps depicted in FIG. 11, for example. Steps S1101 to S1104 depicted in FIG. 11 are the same as steps S401 to S404 depicted in FIG. 4. After step S1104, the terminal 101 transmits UL data through the UC based on the assignment information received at step S1104 (step S1105) and returns to step S1101.

As described above, according to the third embodiment, when transmitting through the LC the control signal permitting the UL transmission through the UC from the terminal 101 to the base station 110, the base station 110 may continuously send out the RTS signal (radio wave) of the UC in the assignment band of the UL transmission in the period until the UL transmission by the terminal 101. The RTS signal is a request signal requesting data transmission.

As a result, the interrupt by another system may be suppressed in the period until the UL transmission by the terminal 101 so as to suppress the interference with the UL transmission by the terminal 101. Therefore, communications may be made more efficient.

A fourth embodiment will be described in terms of portions different from the first embodiment.

FIG. 12 is a diagram of an example of an operation of a wireless communications system according to the fourth embodiment. In FIG. 12, the same portions as those depicted in FIG. 9 are denoted by the same reference numerals used in FIG. 9 and will not be described. In the example depicted in FIG. 12, the base station 110 transmits the RTS signal 203 having the length of one subframe through the UC in the subframe t5.

The base station 110 transmits DMRSs 1201 to 1203 having the length of three subframes in the subframes t6 to t8 subsequent to the subframe t5. The DMRSs are reference signals for demodulating a data signal in the terminal 101.

The band (e.g., resource block) of the DMRSs 1201 to 1203 may be, for example, the same band as the band of the UL transmissions 221 to 225 (UL assignment band). As a result, the UL assignment band may be reserved.

This enables the inhibition of interrupt in the subframes t5 to t8 by a non-LTE system (e.g., wireless LAN system) unable to receive the RTS signal 203, for example. Therefore, even if the terminal 101 does not perform the carrier sense before the UL transmissions 221 to 225, the interference with the UL transmissions 221 to 225 may be suppressed.

The base station 110 may transmit the RTS signal 202 through the LC as depicted in FIG. 2 before transmitting the UL grants 211 to 215.

FIG. 13 is a flowchart of an example of a process by the base station according to the fourth embodiment. The base station 110 according to the fourth embodiment repeatedly executes steps depicted in FIG. 13, for example. Steps S1301 to S1305 depicted in FIG. 13 are the same as steps S1001 to S1005 depicted in FIG. 10. After step S1305, the base station 110 broadcasts the RTS signal through the UC (step S1306).

The base station 110 then transmits the DMRS having the length of three subframes through the UC (step S1307). The base station 110 transmits the control information (UL grant) giving an instruction for transmission of UL data in a subframe subsequent to the DMRS transmission at step S1307 (step S1308) and terminates a series of operations.

The terminal 101 according to the fourth embodiment executes steps depicted in FIG. 11, for example.

As described above, according to the fourth embodiment, when transmitting through the LC the control signal permitting the UL transmission through the UC from the terminal 101 to the base station 110, the base station 110 may continuously send out the DMRS (radio wave) of the UC in the assignment band of the UL transmission in the period until the UL transmission by the terminal 101.

As a result, the interrupt by another system may be suppressed during the period until the UL transmission by the terminal 101 so as to suppress the interference with the UL transmission by the terminal 101. Therefore, communication may be made more efficient.

When transmitting through the LC the control signal permitting the UL transmission through the UC from the terminal 101 to the base station 110, the base station 110 may continuously send out a dummy signal (radio wave) of the UC during the period until the UL transmission by the terminal 101. Also in this case, the interrupt by another system may be suppressed during the period until the UL transmission by the terminal 101 so as to suppress the interference with the UL transmission by the terminal 101. Therefore, communication may be made more efficient.

When transmitting through the LC the control signal permitting the UL transmission through the UC from the terminal 101 to the base station 110, the base station 110 may continuously send out a wireless noise (radio wave) of the UC during the period until the UL transmission by the terminal 101. Also in this case, the interrupt by another system may be suppressed during the period until the UL transmission by the terminal 101 so as to suppress the interference with the UL transmission by the terminal 101. Therefore, communication may be made more efficient.

In the base station 110 according to the first to fourth embodiments, a detecting unit detecting an available carrier wave of the UC (second band) may be implemented by the antenna 502, the unlicensed-band receiving unit 508, and the carrier sensing unit 515 depicted in FIGS. 5A and 5B, for example. The base station 110 also includes a transmitting unit and, if an available carrier wave of the UC is detected, the transmitting unit transmits a UC grant (control signal) permitting a data transmission through the UC from the terminal 101 to the base station 110 and continuously sends out a radio wave of the UC during a period until data transmission. This transmitting unit may be implemented by the MAC control unit 516, the MAC scheduling unit 518, the licensed-band transmitting unit 519, the unlicensed-band transmitting unit 525, and the antennas 531, 532 depicted in FIGS. 5A and 5B, for example.

In the terminal 101 according to the first to fourth embodiments, a receiving unit receiving the UC grant from the base station 110 may be implemented by the antenna 601, the licensed-band receiving unit 602, and the decoding unit 614 depicted in FIGS. 6A and 6B, for example. In the terminal 101, a transmitting unit performing data transmission after a predetermined time from the reception of the UL grant may be implemented by the unlicensed-band transmitting unit 627 and the antenna 601 depicted in FIGS. 6A and 6B, for example.

A fifth embodiment will be described in terms of portions different from the first embodiment.

FIG. 14 is a diagram of an example of operation of a wireless communications system according to the fifth embodiment. In FIG. 14, a horizontal axis indicates time (t) in subframes. The transmission of a data channel in an LTE system is performed on the basis of subframes in synchronization with subframe timing of the base station 110. The data channel in the LTE system is, for example, a physical downlink shared channel (PDSCH) or a physical uplink shared channel (PUSCH).

In contrast, another LTE system or a wireless LAN system without mutual synchronization control with the LTE system transmits a data packet independently of this subframe timing. Therefore, a gap time may occur between an available-channel determination time (radio-resource acquisition time) of Listen-Before-Talk (LBT) on the LTE side and a start time of data packet transmission in response to the result thereof. If another system starts transmission during this gap time, the channel may become busy. This problem occurs in both down-links and up-links.

In this regard, the base station 110 according to the fifth embodiment transmits a signal that the other terminal is not requested to receive, such as a DMRS or a dummy signal, thereby reserving the channel for another device.

In the example depicted in FIG. 14, it is assumed that the UC is in a busy state 1401 (Busy) from the subframe t1 to the middle of the subframe t2. For example, when DL data is in the subframe t1, since the UC is in the busy state 1401 until the middle of the subframe t2, the base station 110 assigns DL transmission to the subframe t3 if a busy state is not newly detected during a back-off time 1406 after a DIFS time 1405 (distributed inter-frame space) has elapsed from the end of the busy state 1401.

In the subframe t3, the base station 110 transmits a DL assign 1402 to the terminal 101 to perform a DL transmission 1403 (Data). Therefore, a gap time 1404 occurs between the busy state 1401 and the subframe t3.

In this regard, the base station 110 wirelessly transmits a DMRS 1407 when the DIFS time 1405 and the back-off time 1406 have elapsed from the end of the busy state 1401. The base station 110 may transmit a dummy signal instead of the DMRS 1407. The dummy signal is a wireless signal not requesting a certain wireless communications apparatus to receive the signal, for example. The base station 110 may transmit wireless noise instead of the DMRS 1407.

This enables the inhibition of interrupt to the UC in the subframe t2 by another system (e.g., another LTE system or a wireless LAN system). Therefore, interference with the DL transmission 1403 may be suppressed.

FIG. 15 is a diagram of an example of down-link transmission. In FIG. 15, a horizontal axis indicates time (t) in subframes. The example depicted in FIG. 15 will be described in terms of a case of performing DL transmission in sub-bands SB1, SB3 among sub-bands SB1 to SB4 of the UC. It is assumed that the UC is shared by the wireless communications system 100 and an LTE system different from the wireless communications system 100. The LTE system different from the wireless communications system 100 synchronizes the subframes mutually with the wireless communications system 100.

In the example depicted in FIG. 15, the sub-band SB1 is in a busy state 1511 in the subframe t1 due to the other LTE system. The sub-band SB2 is in a busy state 1512 in the subframes t1 to t4 due to the other LTE system. The sub-band SB3 is in a busy state 1513 in the subframe t1 due to the other LTE system. The sub-band SB4 is in a busy state 1514 in the subframes t1, t2 due to the other LTE system.

For example, when DL data is in the subframe t1, the base station 110 assigns the DL data to the subframe t3 of the sub-bands SB1, SB3 if a busy state is not newly detected during back-off times 1531, 1533 after a DIFS time 1521 has elapsed from the end of the busy states 1511, 1513 of the sub-bands SB1, SB3. In the subframe t2 of the sub-bands SB1, SB3, the DL data cannot be assigned because of the busy states 1511, 1513 until at the end of the previous subframe t1 of the sub-bands SB1, SB3.

In the subframe t3, the base station 110 transmits a DL assign 1501 to the terminal 101 to perform DL transmissions 1502, 1503 in the sub-bands SB1, SB3. Therefore, the subframe t2 becomes a gap time in the sub-bands SB1, SB3.

In this regard, the base station 110 wirelessly transmits a DMRS 1541 in the sub-band SB1 when the DIFS time 1521 and the back-off time 1531 have elapsed from the end of the busy state 1511. The base station 110 wirelessly transmits a DMRS 1543 in the sub-band SB3 when the DIFS time 1521 and the back-off time 1533 have elapsed from the end of the busy state 1513.

The base station 110 may transmit dummy signals instead of the DMRSs 1541, 1543. The dummy signals are wireless signals without destinations, for example. The base station 110 may transmit wireless noises instead of the DMRSs 1541, 1543.

This enables the inhibition of interrupt to the UC in the subframe t2 by another system (e.g., another LTE system). Therefore, the interference with the DL transmissions 1502, 1503 may be suppressed. In the example depicted in FIG. 15, the same back-off times (the back-off times 1531, 1533) are used in the sub-bands (the sub-bands SB1, SB3).

FIG. 16 is a diagram of another example of down-link transmission. In FIG. 16, the same portions as those depicted in FIG. 15 are denoted by the same reference numerals used in FIG. 15 and will not be described. The example depicted in FIG. 16 will be described in terms of a case of sharing the UC by the wireless communications system 100 and a wireless LAN system. The wireless LAN system is asynchronous with the wireless communications system 100. It is assumed that the sub-bands SB1 to SB4 are in a busy state 1610 from the subframe t1 to the middle of the subframe t2 due to the wireless LAN system.

For example, when DL data is in the subframe t1, since the busy state 1610 exists until the middle of the subframe t2, the base station 110 assigns DL data to the subframe t3 if a busy state is not newly detected during the back-off times 1531, 1533 after the DIFS time 1521 has elapsed from the end of the busy state 1610. In the example depicted in FIG. 16, the base station 110 assigns the DL data to the subframe t3 of the sub-bands SB1, SB3.

In the subframe t3, the base station 110 transmits the DL assign 1501 to the terminal 101 to perform the DL transmissions 1502, 1503 in the sub-bands SB1, SB3. Therefore, a gap time 1550 occurs between the busy state 1610 and the subframe t3 in the sub-bands SB1, SB3.

In this regard, the base station 110 wirelessly transmits the DMRS 1541 in the sub-band SB1 when the DIFS time 1521 and the back-off time 1531 have elapsed from the end of the busy state 1610. The base station 110 wirelessly transmits the DMRS 1543 in the sub-band SB3 when the DIFS time 1521 and the back-off time 1533 have elapsed from the end of the busy state 1610.

The base station 110 may transmit dummy signals instead of the DMRSs 1541, 1543. The dummy signals are wireless signals without destinations, for example. The base station 110 may transmit wireless noises instead of the DMRSs 1541, 1543.

This enables the inhibition of interrupt to the UC in the subframe t2 by another system (e.g., wireless LAN system). Therefore, the interference with the DL transmissions 1502, 1503 may be suppressed.

FIG. 17 is a diagram of an example of up-link transmission. In FIG. 17, a horizontal axis indicates time (t) in subframes. The example depicted in FIG. 17 will be described in terms of a case of sharing the UC by the wireless communications system 100 and an LTE system different from the wireless communications system 100. The LTE system different from the wireless communications system 100 synchronizes the subframes mutually with the wireless communications system 100.

In the example depicted in FIG. 17, the sub-band SB1 is in a busy state 1711 in the subframes t3 to t6 due to the other LTE system. The sub-band SB2 is in a busy state 1712 in the subframe t3 due to the other LTE system. The sub-band SB3 is in a busy state 1713 in the subframe t3 due to the other LTE system. The sub-band SB4 is in a busy state 1714 in the subframes t3, t4 due to the other LTE system.

When receiving a radio resource assignment request for UL transmission from the terminal 101, the base station 110 determines the necessary radio resource (the number of sub-bands). Assuming that this is two sub-bands in this example, if a busy state is not newly detected during a back-off time 1731 after a DIFS time 1721 has elapsed from the ends of the busy states 1712, 1713 of the sub-bands SB2, SB3, the subframe t5 of the sub-bands SB2, SB3 is assigned to the UL transmission of the terminal 101. In this case, the base station 110 transmits a UL grant 1701 in the subframe t1 through the LC to the terminal 101. The base station 110 receives UL data of UL transmission 1702 from the terminal 101 in the subframe t5. Therefore, the subframe t4 becomes a gap time.

In this regard, the base station 110 wirelessly transmits a DMRS 1741 in the sub-bands SB2, SB3 when the DIFS time 1721 and the back-off time 1731 have elapsed from the end of the busy states 1712, 1713.

The base station 110 may transmit a dummy signal instead of the DMRS 1741. The dummy signal is a wireless signal without a destination, for example. The base station 110 may transmit a wireless noise instead of the DMRS 1741.

This enables the inhibition of interrupt to the UC in the subframe t4 by another system (e.g., another LTE system). Therefore, the interference with the DL transmission 1702 may be suppressed.

FIG. 18 is a diagram of another example of up-link transmission. In FIG. 18, the same portions as those depicted in FIG. 17 are denoted by the same reference numerals used in FIG. 17 and will not be described. The example depicted in FIG. 18 will be described in terms of the case of sharing the UC by the wireless communications system 100 and a wireless LAN system. The wireless LAN system is asynchronous with the wireless communications system 100.

It is assumed that the sub-bands SB1 to SB4 are in a busy state 1810 from near the end of the subframe t2 to the middle of the subframe t4 due to the wireless LAN system. In this case, a gap time 1850 is generated from the middle of the subframe t4 until the subframe t5.

In this regard, the base station 110 wirelessly transmits the DMRS 1741 in the sub-bands SB2, SB3 when a DIFS time 1821 and the back-off time 1731 have elapsed from the end of the busy state 1810.

The base station 110 may transmit a dummy signal instead of the DMRS 1741. The dummy signal is a wireless signal without a destination, for example. The base station 110 may transmit a wireless noise instead of the DMRS 1741.

This enables the inhibition of interrupt to the UC in the subframe t4 by another system (e.g., another wireless LAN system). Therefore, the interference with the DL transmission 1702 may be suppressed.

Figure 19:
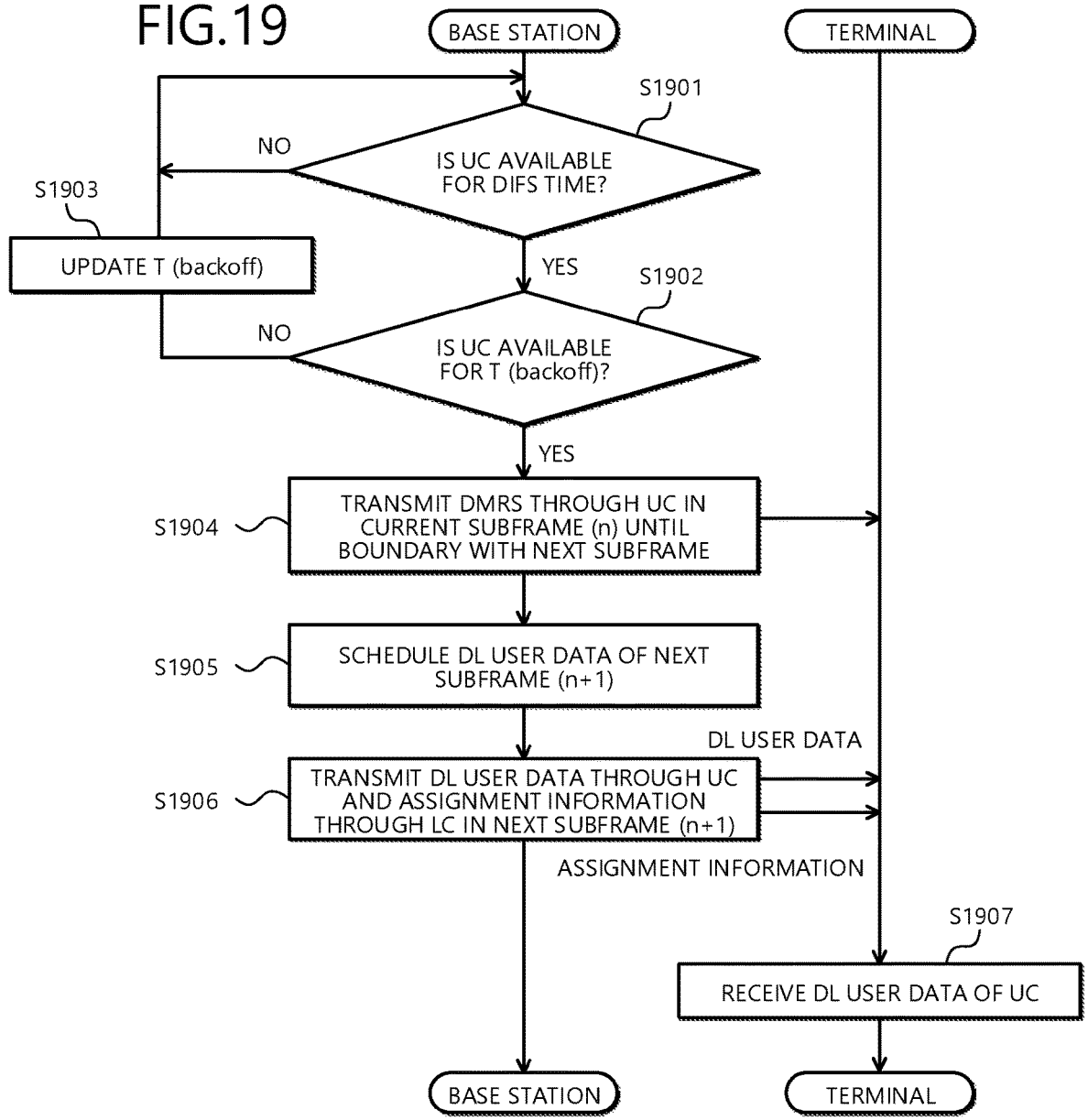
FIG. 19 is a flowchart of an example of processes of the base station and the terminal in the down-link data transmission.

FIG. 19 is a flowchart of an example of processes of the base station and the terminal in the down-link data transmission. The base station 110 and the terminal 101 according to the fifth embodiment execute steps depicted in FIG. 19, for example. First, the base station 110 determines whether the UC is available for a DIFS time (step S1901). If the UC is not available for a DIFS time (step S1901: NO), the base station 110 returns to step S1901.

If the UC is available for a DIFS time at step S1901 (step S1901: YES), the base station 110 determines whether the UC is available for T(backoff) (step S1902). T(backoff) is a back-off time required for a back-off process. If the UC is not available for T(backoff) (step S1902: NO), the base station 110 updates T(backoff) (step S1903) and returns to step S1901.

If the UC is available for T(backoff) at step S1902 (step S1902: YES), the base station 110 transmits a DMRS to the terminal 101 through the UC in the current subframe (n) until the boundary with (the start of) the next subframe (step S1904).

The base station 110 then schedules DL user data of the next subframe (n+1) (step S1905). Based on a result of the scheduling at step S1905, the base station 110 transmits the DL user data through the UC and the assignment information (DL assign) through the LC in the next subframe (n+1) (step S1906).

On the other hand, based on the assignment information transmitted at step S1906, the terminal 101 receives the DL user data of the UC transmitted from the base station 110, in the next subframe (n+1) (step S1907).

Conventionally, the transmission and reception of data packets are performed on the basis of subframes in LTE, for example, and therefore, a gap time may occur between a radio-resource acquisition time of LBT on the LTE side and a start time of data packet transmission in response to the result thereof. If another system starts transmission in this gap time, a channel may become busy.

In this regard, according to the fifth embodiment, when detecting an available carrier wave of the UC in a first subframe (first unit period) in the DL, the base station 110 continuously sends out a radio wave of the UC in at least a portion of the remaining gap period of the first subframe. In a second subframe (second unit period) subsequent to the first subframe, the base station 110 transmits through the LC to the terminal 101, a control signal indicating data transmission through the UC from the base station 110 to the terminal 101, so as to perform the data transmission through the UC. As a result, another system may be prevented from performing wireless transmission in the gap time, so as to suppress a collision between the DL transmission and the wireless transmission by the other system.

Through the UL, for example, as is the case with the third and fourth embodiments, when transmitting through the LC the control signal permitting the UL transmission through the UC from the terminal 101 to the base station 110, the base station 110 may continuously send out the DL data (radio wave) of the UC in the period until the UL transmission by the terminal 101. As a result, another system may be prevented from performing wireless transmission during the gap time, so as to suppress a collision between the DL transmission and the wireless transmission by the other system.

In the base station 110 according to the fifth embodiment, a detecting unit detecting an available carrier wave of the UC (second band) may be implemented by the antenna 502, the unlicensed-band receiving unit 508, and the carrier sensing unit 515 depicted in FIGS. 5A and 5B, for example. The base station 110 also includes a transmitting unit that, if an available carrier wave of the UC (second band) is detected in the first subframe (first unit period), continuously sends out a radio wave of the UC in at least a portion of the remaining period of the first subframe.

In the second subframe (second unit period) subsequent to the first subframe, this transmitting unit transmits through the LC (first band) to the terminal 101, a UC grant (control signal) indicating data transmission through the UC from the base station 110 to the terminal 101, so as to perform the data transmission. This transmitting unit may be implemented by the MAC control unit 516, the MAC scheduling unit 518, the licensed-band transmitting unit 519, the unlicensed-band transmitting unit 525, and the antennas 531, 532 depicted in FIGS. 5A and 5B, for example.

In the terminal 101 according to the fifth embodiment, a first receiving unit receiving the UC grant from the base station 110 may be implemented by the antenna 601, the licensed-band receiving unit 602, and the decoding unit 614 depicted in FIGS. 6A and 6B, for example. The terminal 101 also includes a second receiving unit receiving data of data transmission by the base station 110 based on the received UC grant. This second receiving unit may be implemented by the antenna 601, the unlicensed-band receiving unit 606, and the decoding unit 614 depicted in FIGS. 6A and 6B, for example.

A sixth embodiment will be described in terms of portions different from the first embodiment.

FIG. 20 is a diagram of an example of operation of a wireless communications system according to the sixth embodiment. In FIG. 20, a horizontal axis indicates time (t) in subframes. In the gap time described in the fifth embodiment, the base station 110 according to the sixth embodiment transmits signals such as a control signal and a data signal to the terminal 101.

In the example depicted in FIG. 20, it is assumed that the UC is in a busy state 2010 (Busy) from the subframe t1 to the middle of the subframe t2 due to another wireless LAN system, for example. For example, when DL data is in the subframe t1, since the UC is in the busy state 2010 until the middle of the subframe t2, the base station 110 assigns DL transmission to the subframe t3.

In the subframe t3, the base station 110 transmits a DL assign 2001 to the terminal 101 to perform a DL transmission 2002 (Data). Therefore, a gap time 2020 occurs between the busy state 2010 and the subframe t3.

In this regard, the base station 110 wirelessly transmits DL data 2023 (User Data) when a DIFS time 2021 and a back-off time 2022 have elapsed from the end of the busy state 2010. The base station 110 may transmit a control signal instead of the DL data 2023. As a result, a channel may be reserved for another device.

The base station 110 stores to the DL assign 2001 information (such as scheduling information) for receiving (e.g., modulating) the DL data 2023. The terminal 101 buffers received signals corresponding to the last subframe, for example, and receives (reproduces) the DL data 2023 transmitted during the gap time 2020 from the base station 110, based on down-link scheduling information supplied through the DL assign 2001 of the LC.

This enables the inhibition of interrupt to the UC in the subframe t2 by another system (e.g., another LTE system or a wireless LAN system). Therefore, the interference with the DL transmission 2002 may be suppressed. Additionally, by transmitting the data signal and the control signal at the gap time 2020, the utilization efficiency of radio resources may be improved.

FIG. 21 is a flowchart of an example of a process of the down-link data transmission. The base station 110 and the terminal 101 according to the sixth embodiment execute steps depicted in FIG. 21, for example. Steps S2101 to S2103 depicted in FIG. 21 are the same as steps S1901 to S1903 depicted in FIG. 19.

If the UC is available for T(backoff) at step S2102 (step S2102: YES), the base station 110 schedules DL user data to the UC in the current subframe (n) until a boundary with (the start of) the next subframe (step S2104). Based on a result of the scheduling at step S2104, the base station 110 transmits the DL user data through the UC (step S2105).

The base station 110 then schedules DL user data of the next subframe (n+1) (step S2106). Based on a result of the scheduling at step S2106, the base station 110 transmits the DL user data through the UC and the assignment information (DL assign) through the LC in the next subframe (n+1) (step S2107).

On the other hand, based on the assignment information transmitted at step S2107, the terminal 101 receives the DL user data of the UC transmitted from the base station 110 at steps S2105 and D2107 (step S2108).

Conventionally, the transmission and reception of data packets are performed on the basis of subframes in LTE, for example, and therefore, a gap time may occur between a radio-resource acquisition time of LBT on the LTE side and a start time of data packet transmission in response to the result thereof. If another system starts transmission during this gap time, the channel may become busy.

In this regard, according to the sixth embodiment, when detecting an available carrier wave of the UC in the first subframe in the DL, the base station 110 performs signal transmission through the UC in at least a portion of the remaining gap period of the first subframe and in the second subframe. The base station 110 transmits in the second subframe, the DL assign (control signal) indicating the signal transmission in these periods.

The terminal 101 buffers the received signals from the base station so as to receive the signal of the signal transmission by the base station 110 in the periods described above, based on the DL assign transmitted from the base station 110 in the second subframe.

As a result, the DL transmission may be performed even if the gap time is shorter than one subframe. Therefore, another system may be prevented from performing wireless transmission during the gap time, so as to suppress collision between the DL transmission and the wireless transmission by another system. Additionally, by transmitting the data signal and the control signal during the gap time, the utilization efficiency of radio resources may be improved.

In the base station 110 according to the sixth embodiment, a detecting unit detecting an available carrier wave of the UC (second band) may be implemented by the antenna 502, the unlicensed-band receiving unit 508, and the carrier sensing unit 515 depicted in FIGS. 5A and 5B, for example.

The base station 110 also includes a transmitting unit. If an available carrier wave of the UC is detected in the first subframe (first unit period), this transmitting unit performs signal transmission through the UC in at least a portion of the remaining period of the first subframe and in the second subframe (second unit period) subsequent to the first subframe.

This transmitting unit transmits in the second subframe, the DL assign (control signal) indicating the signal transmission in at least a portion of the remaining period of the first subframe and in the second subframe subsequent to the first subframe. This transmitting unit may be implemented by the MAC control unit 516, the MAC scheduling unit 518, the licensed-band transmitting unit 519, the unlicensed-band transmitting unit 525, and the antennas 531, 532 depicted in FIGS. 5A and 5B, for example.

In the terminal 101 according to the sixth embodiment, a buffering unit buffering the received signals from the base station 110 may be implemented by the memory 556 depicted in FIGS. 5C and 5D, for example. The terminal 101 includes a receiving unit receiving the signals of the signal transmission by the base station 110 in at least a portion of the remaining period of the first subframe and in the second subframe, based on the DL assign transmitted from the base station 110 in the second subframe. This receiving unit uses the buffered received signals to receive (reproduce) the signals. This receiving unit may be implemented by the antenna 601, the unlicensed-band receiving unit 608, and the decoding unit 614 depicted in FIGS. 6A and 6B, for example.

A seventh embodiment will be described in terms of portions different from the first embodiment.

FIGS. 22A, 22B, and 22C are diagrams of an example of operation of a wireless communications system according to the seventh embodiment. In FIGS. 22A to 22C, a horizontal axis indicates time (t) in subframes. In the example depicted in FIGS. 22A to 22C, it is assumed that the base station 110 has assigned the subframes t7 to t10 to the UL transmission of the terminal 101 through the UC. In the seventh embodiment, the UL transmission of the terminal 101 may be shifted to frames after the subframes t7 to t10. The base station 110 transmits UL grants 2211 to 2214 through the LC to the terminal 101 in the subframes t3 to t6 without performing a carrier sense.

On the other hand, the terminal 101 performs a carrier sense 2220 in the subframe t6. In the example depicted in FIG. 22A, it is confirmed that the UC is available by the carrier sense 2220 in the subframe t6. In this case, the terminal 101 performs UL transmissions 2231 to 2234 in the subframes t7 to t10. This is the shortest case from the transmission of the UL grants 2211 to 2214 to the UL transmissions 2231 to 2234.

In the example depicted in FIG. 22B, it is not confirmed that the UC is available by the carrier sense 2220 in the subframe t6. In this case, the terminal 101 continues the carrier sense 2220 also in the subframe t7. In the example depicted in FIG. 22B, it is confirmed that the UC is available by the carrier sense 2220 in the subframe t7. In this case, the terminal 101 performs the UL transmissions 2231 to 2234 in the subframes t8 to t11.

In the example depicted in FIG. 22C, it is not confirmed that the UC is available by the carrier sense 2220 in the subframe t6 as well as the subframe t7. In this case, the terminal 101 continues the carrier sense 2220 in the subframe t8 and thereafter. In the example depicted in FIG. 22C, it is confirmed that the UC is available by the carrier sense 2220 in the subframe t10. In this case, the terminal 101 performs the UL transmissions 2231 to 2234 in the subframes t11 to t14. This is the longest case from the transmission of the UL grants 2211 to 2214 to the UL transmissions 2231 to 2234.

A maximum carrier sense time 2221 is a maximum time of duration of the carrier sense 2220 and is preliminarily set in the base station 110 and the terminal 101, for example. In the example depicted in FIG. 22C, the maximum carrier sense time 2221 is five subframes.

If the duration of the carrier sense 2220 exceeds the maximum carrier sense time 2221, the terminal 101 abandons the UL transmission. For example, if it is not confirmed that the UC is available by the carrier sense 2220 even in the subframe t10, the terminal 101 abandons the UL transmissions 2231 to 2234.

For example, in the cases depicted in FIGS. 22B and 22C, the subframes t11, t12 may have UL transmissions assigned thereto for a terminal different from the terminal 101. In this case, the terminal different from the terminal 101 also has the same function as the terminal 101 and determines that the UC is not available by a carrier sense in the subframes t11, t12, and shifts the UL transmissions to later subframes. This enables the suppression of collision with the UL transmissions in the subframes t11, t12 by the terminal 101.

As described above, the base station 110 speculatively transmits the UL grants without performing a carrier sense of the UC. On the other hand, the terminal 101 waits until detecting that the UC is available by a carrier sense, before performing the UL transmissions. In this case, a channel may not be reserved by the RTS, for example. Additionally, by setting the maximum carrier sense 2221 to impose a limitation on a waiting time of the terminal 101, the terminals may be prevented from cumulatively waiting whereby delay increases.

For example, a transmission interval of the UL grants or the maximum carrier sense time 2221 may be controlled corresponding to the degree of channel congestion of the UC. For example, when the degree of channel congestion of the UC is higher, the base station 110 shortens the interval of transmission of the UL grants to the terminal 101. As a result, even if the UL transmissions are abandoned, the UL grants may be transmitted again in a short time to suppress a decrease in throughput.

For example, when the degree of channel congestion of the UC is higher, the base station 110 and the terminal 101 increase the maximum carrier sense time 2221. As a result, the probability of abandonment of the UL transmissions may be reduced to suppress a decrease in throughput. The degree of channel congestion may be implemented by using various types of information, for example, the frequency of occurrence of UL transmission requests to the base station 110, the number of terminals connected to the base station 110, the frequency of occurrence of waiting states or abandonment of UL transmissions.

FIGS. 23A, 23B, and 23C are diagrams of another example of operation of the wireless communications system according to the seventh embodiment. In FIGS. 23A to 23C, a horizontal axis indicates time (t) in subframes.

As depicted in FIGS. 23A to 23C, the terminal 101 may control the transmission power of the UL transmissions 2231 to 2234 depending on the duration of the carrier sense 2220. For example, when the duration of the carrier sense 2220 is longer, the terminal 101 increases the transmission power of the UL transmissions 2231 to 2234.

The terminal 101 may control the MCS level of the UL transmissions 2231 to 2234 corresponding to the duration of the carrier sense 2220. For example, when the duration of the carrier sense 2220 is longer, the terminal 101 increases the MCS level of the UL transmissions 2231 to 2234. For example, when the duration of the carrier sense 2220 is shorter, the terminal 101 applies to the UL transmissions 2231 to 2234 the MCS level corresponding to a modulation mode with lower propagation characteristics. The modulation mode with lower propagation characteristics is, for example, a more multi-valued modulation mode and a modulation mode with a higher coded rate.

In this case, for example, the base station 110 and the terminal 101 preliminarily share correspondence information of the duration of the carrier sense 2220 and the MCS level. As a result, the base station 110 may receive the UL data corresponding to the terminal 101 changing the MCS level depending on the duration.

As described above, the transmission power or the MCS level of the UL transmissions 2231 to 2234 is controlled corresponding to the duration of the carrier sense 2220. As a result, for example, even if a channel state varies after the time point of scheduling by the base station 110, a decrease in throughput may be suppressed.

The transmission power or the MCS level of the UL transmissions 2231 to 2234 may be controlled corresponding to a channel state detected by the carrier sense 2220. For example, when the channel state detected by the carrier sense 2220 is poor, the terminal 101 increases the transmission power of the UL transmissions 2231 to 2234. The channel state is a magnitude of interference power, for example.

As described above, the transmission power of the UL transmissions 2231 to 2234 is controlled corresponding to the channel state detected by the carrier sense 2220. As a result, a decrease in through-put may be suppressed. The transmission power or the MCS level of the UL transmissions 2231 to 2234 may be controlled corresponding to a combination of the duration of the carrier sense 2220 and the channel state.

Figure 24:
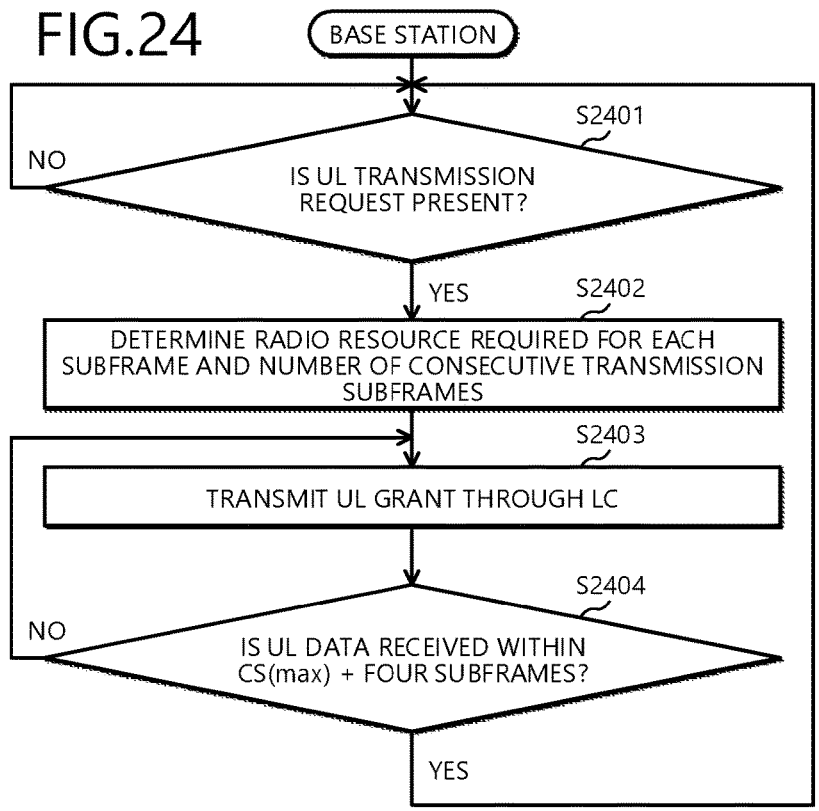
FIG. 24 is a flowchart of an example of a process by the base station according to the seventh embodiment.

FIG. 24 is a flowchart of an example of a process by the base station according to the seventh embodiment. The base station 110 according to the seventh embodiment executes steps depicted in FIG. 24, for example. First, the base station 110 determines whether a UL transmission request is (step S2401). If a UL transmission request is not present (step S2401: NO), the base station 110 returns to step S2401.

If a UL transmission request is present at step S2401 (step S2401: YES), the base station 110 determines a radio resource required for each subframe and the number of consecutive transmission subframes (step S2402).

The base station 110 transmits a UL grant based on a result of determination at step S2402 through the LC to the terminal 101 (step S2403). The base station 110 determines whether UL data is received from the terminal 101 within a predetermined time CS(max)+four subframes. The predetermined time CS(max) is the maximum carrier sense time 2221 described above, for example.

If UL data is not received at step S2404 (step S2404: NO), the base station 110 returns to step S2403. If UL data is received (step S2404: YES), the base station 110 returns to step S2401.

Figure 25:
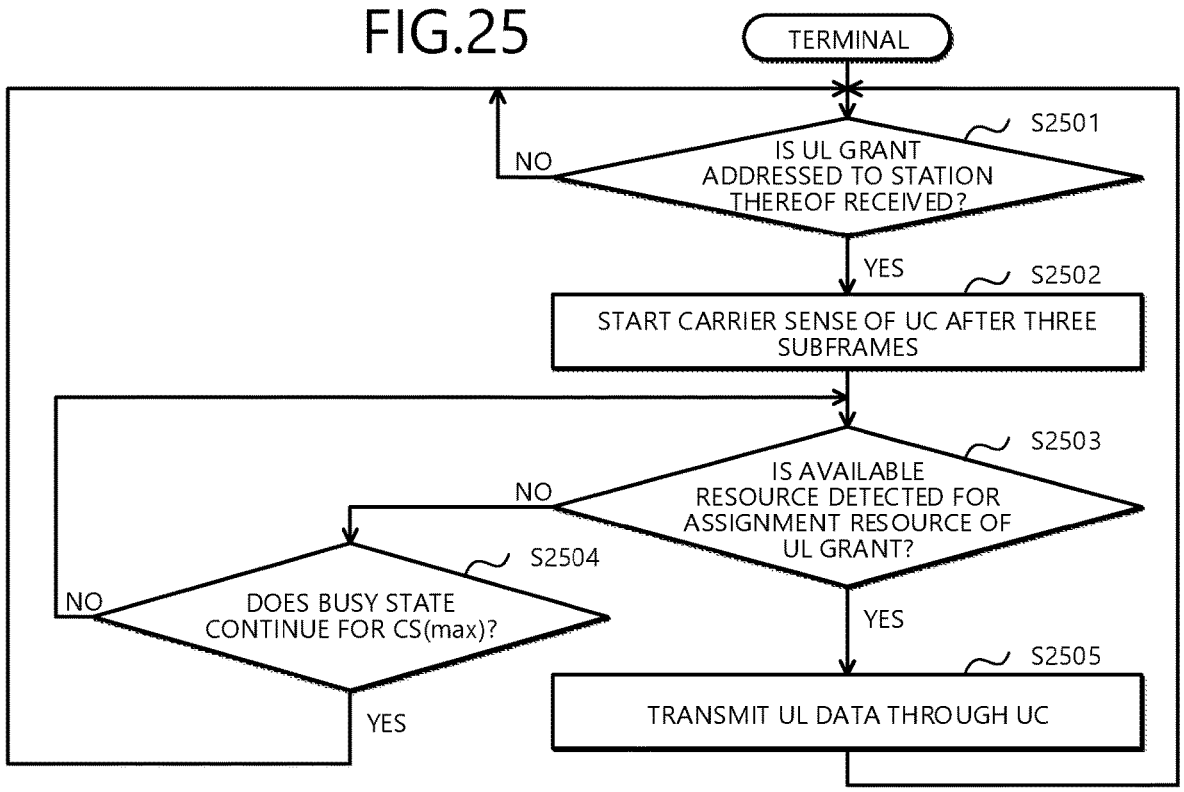
FIG. 25 is a flowchart of an example of a process by the terminal according to the seventh embodiment.

FIG. 25 is a flowchart of an example of a process by the terminal according to the seventh embodiment. The terminal 101 according to the seventh embodiment executes steps depicted in FIG. 25, for example. First, the terminal 101 determines whether a UL grant addressed to the station thereof is received (step S2501). If a UL grant addressed to the station thereof is not received (step S2501: NO), the terminal 101 returns to step S2501.

If a UL grant addressed to the station thereof is received at step S2501 (step S2501: YES), the terminal 101 starts a carrier sense of the UC after three subframes from the reception of the UL grant (step S2502).

The terminal 101 determines whether an available resource is detected for the assignment resource of the UL grant received at step S2501 by the carrier sense started at step S2502 (step S2503). If an available resource is not detected for the assignment resource of the UL grant (step S2503: NO), the terminal 101 determines whether a busy state continues for the predetermined time CS(max) from the start of the carrier sense at step S2502 (step S2504). The predetermined time CS(max) is the maximum carrier sense time 2221 described above, for example.

If a busy state does not continue for the predetermined time CS(max) (step S2504: NO), the terminal 101 returns to step S2503. If a busy state continues for the predetermined time CS(max) (step S2504: YES), the terminal abandons the transmission of UL data and returns to step S2501.

If an available resource is detected for the assignment resource of the UL grant at step S2503 (step S2503: YES), the terminal 101 transmits UL data through the UC (step S2505) and returns to step S2501.

Conventionally, a problem exists that if a carrier sense is performed on the terminal side after UL scheduling and a channel is used at the time of carrier sense, the scheduling is cancelled and is wasted.

In this regard, according to the seventh embodiment, the base station 110 does not perform a carrier sense of the UC. The terminal 101 detects an available carrier wave of the UC after a predetermined time (e.g., after three subframes) from the transmission of the UL grant and performs the UL transmission after waiting until detection of an available carrier wave.

As a result, the scheduling may be prevented from being wasted when the channel is used at the time of the carrier sense of the terminal 101. For example, the amount of processing for scheduling and overhead of a control signal giving notification of a scheduling result may be curtailed.

If an available carrier wave is not detected even after waiting for the maximum carrier sense time 2221 (a predetermined period) from the start of the carrier sense (detection), the terminal 101 stops the carrier sense of the UC. In this case, the terminal 101 does not perform the UL transmission based on the received UL grant. As a result, a reduction in throughput of the wireless communications system 100 due to a long waiting time may be suppressed.

If the terminal 101 does not perform the UL transmission even when the maximum carrier sense time 2221 has elapsed, the base station 110 transmits again through the LC to the terminal 101, the UL grant permitting the data transmission through the UC from the terminal 101 to the base station 110. As a result, if the UL transmission is abandoned, the UL transmission may be started again.

The base station 110 may give an instruction through the UL grant to the terminal 101 on whether the carrier sense by the terminal 101 is required. In this case, the terminal 101 performs the carrier sense based on the instruction through the UL grant. As a result, the base station 110 may control whether the terminal 101 performs the carrier sense.

The terminal 101 may control at least any of the transmission power, the modulation mode, and the coded rate of the UL transmission corresponding to the waiting time until detection of an available carrier wave. The terminal 101 may control the transmission power of the UL transmission corresponding to the degree of congestion of the UC.

The base station 110 according to the seventh embodiment includes a transmitting unit transmitting through the LC (first band) to the terminal 101, the UL grant (control signal) permitting a data transmission through the UC (second band) from the terminal 101 to the base station 110. This transmitting unit may be implemented by the MAC control unit 516, the MAC scheduling unit 518, the licensed-band transmitting unit 519, and the antenna 531 depicted in FIGS. 5A and 5B, for example.

The base station 110 includes a receiving unit detecting an available carrier wave of the UC after a predetermined time from the transmission of the UL grant and receiving data of data transmission by the terminal 101 performing the data transmission after waiting until detection of an available carrier wave. This receiving unit may be implemented by the antenna 502 and the unlicensed-band receiving unit 508, for example.

In the terminal 101 according to the seventh embodiment, a receiving unit receiving the UC grant from the base station 110 may be implemented by the antenna 601, the licensed-band receiving unit 602, and the decoding unit 614 depicted in FIGS. 6A and 6B, for example. The terminal 101 includes a transmitting unit detecting an available carrier wave of the UC after three subframes (predetermined time) from the reception of the UL grant and performing the data transmission after waiting until detection of an available carrier wave. This transmitting unit may be implemented by the carrier sensing unit 617, the unlicensed-band transmitting unit 627, and the antenna 601 depicted in FIGS. 6A and 6B, for example.

As described above, according to the wireless communications system, the base station, and the terminal, communications may be made more efficient.

For example, conventionally, in consideration of an impact on the current LTE specifications, a study is being made of a method of utilizing an unlicensed band for an additional carrier in the LTE using a licensed band. In this method, for transmission of control information, for example, the usage of the carriers of the licensed band is being studied. In this method, for example, a method of coexistence with a wireless LAN in the unlicensed band is being studied.

For example, in LTE up-link, the base station considers the processing time at the terminal and through the PCC, notifies the terminal of the scheduling information (UL grant) for the corresponding data k subframes before UL data transmission.

Since the base station does not know at the time point of scheduling whether the SCC is available k-subframes later, the terminal performs a carrier sense to confirm availability of channels before actually performing the data transmission with the scheduled resource. This leads to a problem that if no channel is available at this time point, the scheduling is canceled and wasted. In this regard, for example, the seventh embodiment described above may prevent scheduling from being wasted.

If the base station performs a carrier sense, the base station transmits through the SCC, a Clear-To-Send (CTS) packet after confirming an available channel through the carrier sense, thereby reserving the channel for another terminal. In this case, a temporal difference of k subframes from the CTS packet transmission to the data transmission causes a problem that a resource is wasted during this period or that the channel is used by another system such as a wireless LAN. In this regard, for example, the first to sixth embodiments described above may prevent a resource from being wasted or another system such as a wireless LAN from using the channel.

However, in the conventional techniques described above, for example, if a licensed band and an unlicensed band are used together, communication may not efficiently be performed.

One aspect of the present invention achieves an effect in that communication may be made more efficient.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system configured to perform wireless communication by using a first band dedicated to the system and a second band, the system comprising:
   a base station configured to
      detect an available carrier wave of the second band, wherein the second band is shared by the wireless communication system and another wireless communication system with a different base station from the base station,
      control a detection interval of the available carrier wave or a detection period of the available carrier wave; and continuously transmit downlink user data in the second band during at least a portion of a remaining period of a first unit period, wherein
      the downlink user data is scheduled to have a data length equal to a length of the portion of the remaining period, when detecting the available carrier wave of the second band in the first unit period, and
   transmit in a second unit period subsequent to the first unit period, a control signal that permits the terminal to transmit uplink data to the base station in the second band, the base station transmitting the control signal in the first band to the terminal so as to perform the uplink data transmission; and
   the terminal configured to transmit the uplink data, based on the control signal transmitted by the base station.

2. A base station of a wireless communications system configured to perform wireless communication by using a first band dedicated to the system and a second band, the base station comprising:
   a memory; and
   a processor coupled to the memory, the processor configured to:
   detect an available carrier wave of the second band, wherein the second band is shared by the wireless communication system and another wireless communication system with a different base station from the base station;
   control a detection interval of the available carrier wave or a detection period of the available carrier wave; and
   continuously transmit downlink data of the second band during at least a portion of a remaining period of a first unit period, when detecting the available carrier wave of the second band in the first unit period, wherein the downlink data is scheduled to have a data length equal to a length of the portion of the remaining period; and transmit in a second unit period subsequent to the first unit period, a control signal that permits the terminal to transmit uplink data to the base station in the second band, the base station transmitting the control signal in the first band to the terminal so as to perform the uplink data transmission.

3. A terminal of a wireless communications system configured to perform wireless communication by using a first band dedicated to the system and a second band, the terminal comprising:
a memory; and
a processor coupled to the memory, the processor configured to:
receive in the first band from a base station, a control signal that permits the terminal to transmit uplink data to the base station in the second band, when detecting an available carrier wave of the second band in a first unit period, the base station continuously transmitting downlink user data in the second band in at least a portion of a remaining period of the first unit period and transmits the control signal in a second unit period subsequent to the first unit period in the first band to the terminal so as to perform the uplink data transmission, wherein
the second band is shared by the wireless communication system and another wireless communication system with a different base station from the base station, and
the downlink user data is scheduled to have a data length equal to a length of the portion of the remaining period, the base station controlling a detection interval of the available carrier wave or a detection period of the available carrier wave; and
transmit uplink data of the data transmission, based on the control signal received from the base station.

4. A wireless communications system configured to perform wireless communication by using a first band dedicated to the system and a second band, the system comprising:
a base station configured to perform, when detecting an available carrier wave of the second band in a first unit period, downlink user data transmission in the second band from the base station to a terminal in at least a portion of a period remaining of the first unit period and a second unit period subsequent to the first unit period, wherein
the second band is shared by the wireless communication system and another wireless communication system with a different base station from the base station, and
the downlink user data is scheduled to have a data length equal to a length of the portion of the remaining period, the base station transmitting in the second unit period, a control signal indicating the downlink user transmission in at least the portion of the period, the base station controlling a detection interval of the available carrier wave or a detection period of the available carrier wave; and
the terminal configured to transmit uplink data in the second unit period, based on the control signal transmitted from the base station in the second unit period.

5. A base station of a wireless communications system configured to perform wireless communication by using a first band dedicated to the system and a second band, the base station comprising:
a memory; and
a processor coupled to the memory, the processor configured to:
detect an available carrier wave of the second band;
control a detection interval of the available carrier wave or a detection period of the available carrier wave; and
perform downlink user data transmission in the second band from the base station to a terminal in at least a portion of a period remaining of a first unit period and a second unit period subsequent to the first unit period, wherein
the second band is shared by the wireless communication system and another wireless communication system with a different base station from the base station, and
the downlink user data is scheduled to have a data length equal to a length of the portion of the remaining period, when detecting the available carrier wave of the second band in the first unit period; and
transmit in the second unit period, a control signal indicating the uplink data transmission in at least the portion of the period and the second unit period.

6. A terminal of a wireless communications system configured to perform wireless communication by using a first band dedicated to the system and a second band, the terminal comprising:
a memory; and
a processor coupled to the memory, the processor configured to:
receive downlink user data in at least a portion of a period and a second unit period based on a control signal transmitted from a base station in the second unit period, wherein
the second band is shared by the wireless communication system and another wireless communication system with a different base station from the base station, and
the control signal is received from the base station that, when detecting an available carrier wave of the second band in a first unit period, performs uplink data transmission in the second band from the base station to the terminal in at least a portion of a period remaining of the first unit period, and
the downlink user data is scheduled to have a data length equal to a length of the portion of the remaining period and a second unit period subsequent to the first unit period and transmits in the second unit period, the control signal that permits the terminal to transmit uplink data to the base station indicating data transmission in the second band and the control signal indicating the signal transmission in at least the portion of the period and the second unit period, the base station controlling a detection interval of the available carrier wave or a detection period of the available carrier wave.

* * * * *